United States Patent
Wortmann et al.

(10) Patent No.: US 8,895,901 B2
(45) Date of Patent: Nov. 25, 2014

(54) PIPELINE FOR CARRYING A MOLTEN SALT

(75) Inventors: Jürgen Wortmann, Limburgerhof (DE);
Michael Lutz, Speyer (DE); Martin Gärtner, Worms (DE); Kerstin Schierle-Arndt, Zwingenberg (DE);
Stephan Maurer, Neustadt-Gimmeldingen (DE); Michael Ladenberger, Ludwigshafen (DE);
Karolin Geyer, Mannheim (DE);
Florian Garlichs, Neustadt (DE)

(73) Assignee: BASF SE, Ludwigshafen (DE)

( * ) Notice: Subject to any disclaimer, the term of this patent is extended or adjusted under 35 U.S.C. 154(b) by 109 days.

(21) Appl. No.: 13/474,033

(22) Filed: May 17, 2012

(65) Prior Publication Data

US 2012/0292303 A1 Nov. 22, 2012

Related U.S. Application Data

(60) Provisional application No. 61/487,719, filed on May 19, 2011, provisional application No. 61/539,494, filed on Sep. 27, 2011.

(51) Int. Cl.
*F27D 11/00* (2006.01)
*F24J 2/46* (2006.01)
*E03B 7/10* (2006.01)

(52) U.S. Cl.
CPC ............... *F27D 11/00* (2013.01); *F24J 2/4649* (2013.01); *F24J 2/4607* (2013.01); *F24J 2/4632* (2013.01); *Y02E 10/40* (2013.01)
USPC ............................ 219/385; 219/535; 392/469

(58) Field of Classification Search
USPC ................. 219/385, 629, 630, 628, 535, 536; 392/469, 488
See application file for complete search history.

(56) References Cited

U.S. PATENT DOCUMENTS

| | | | | |
|---|---|---|---|---|
| 3,195,627 A | * | 7/1965 | Goodloe | 165/181 |
| 3,293,407 A | * | 12/1966 | Ando | 392/469 |
| 3,975,819 A | * | 8/1976 | Ando | 29/611 |
| 4,200,148 A | * | 4/1980 | Friefeld et al. | 165/10 |
| 6,167,883 B1 | | 1/2001 | Beran et al. | |
| 2008/0196917 A1 | | 8/2008 | Hofmann et al. | |

FOREIGN PATENT DOCUMENTS

| | | |
|---|---|---|
| DE | 859549 C | 12/1952 |
| DE | 1515139 B1 | 2/1970 |
| DE | 10327493 A1 | 1/2005 |
| EP | 1958832 A1 | 8/2008 |
| EP | 2006593 A1 | 12/2008 |
| JP | 08-320096 | 12/1996 |
| SU | 540102 A1 | 12/1976 |
| WO | WO-2007000569 A1 | 1/2007 |

* cited by examiner

*Primary Examiner* — Shawtina Fuqua
(74) *Attorney, Agent, or Firm* — Drinker Biddle & Reath LLP

(57) ABSTRACT

The invention relates to a pipeline for carrying a molten salt, with a pipe wall that is stable with respect to the temperatures occurring. A heating conductor (21) is provided inside the pipeline (5) for heating, the heating conductor (21) preferably not lying against the inner wall of the pipeline (5).

21 Claims, 12 Drawing Sheets

FIG.13
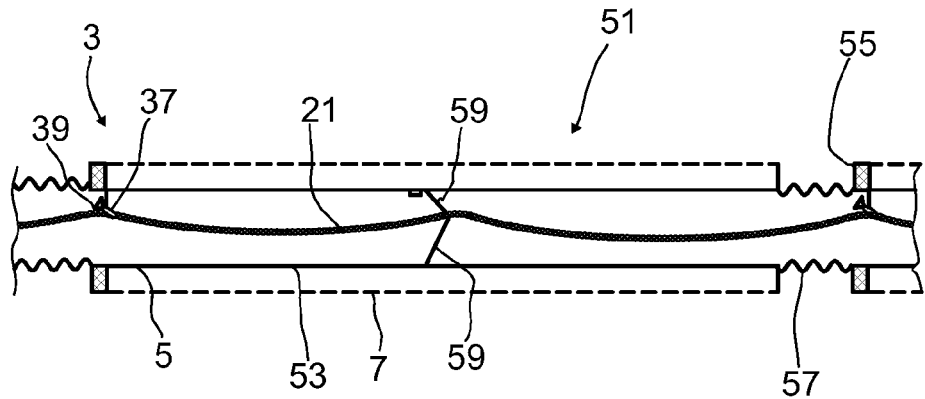
FIG.14
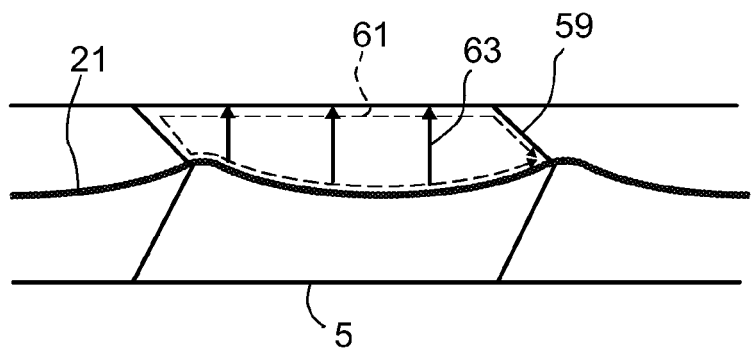
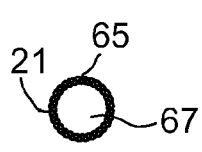 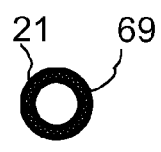 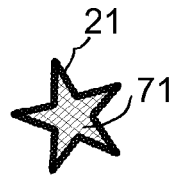 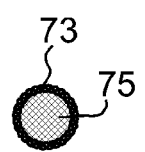 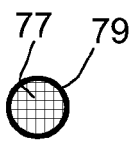
FIG.15A    FIG.15B    FIG.15C    FIG.15D    FIG.15E FIG.18A-A'
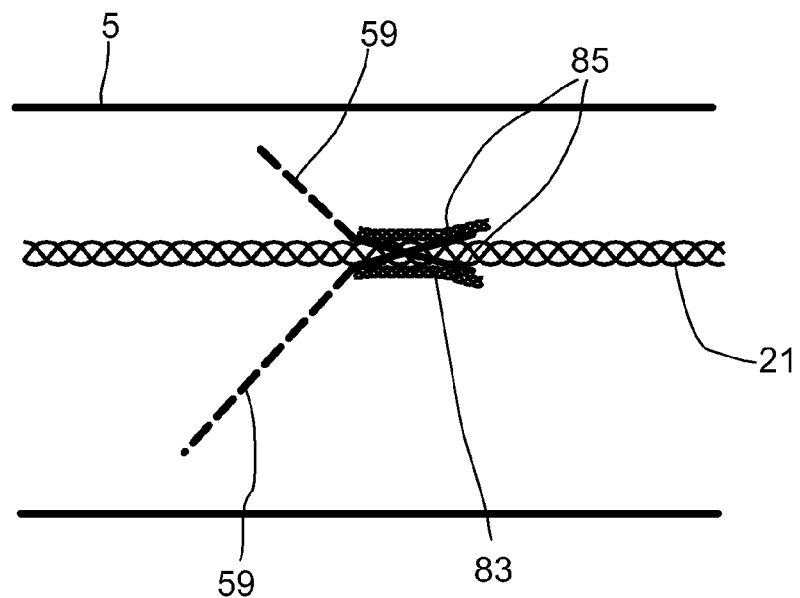
FIG.19B-B'
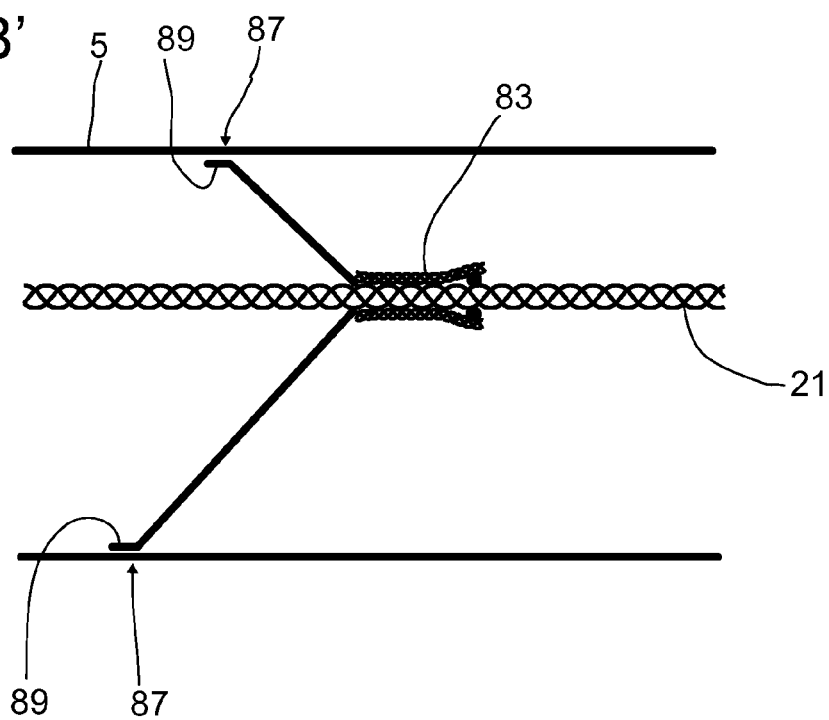

PIPELINE FOR CARRYING A MOLTEN SALT

CROSS-REFERENCE TO RELATED APPLICATIONS

Priority

Priority is claimed to U.S. Provisional Patent Application Ser. No. 61/487,719, filed May 19, 2011, and to U.S. Provisional Patent Application Ser. No. 61/539,494, filed Sep. 27, 2011. The disclosures of the aforementioned priority applications are incorporated herein by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The invention is based on a pipeline for carrying a molten salt, with a pipe wall that is stable with respect to the temperatures occurring.

2. Description of Related Art

Pipelines through which a molten salt flows are intended for use in solar power plants, for example, particularly parabolic-trough solar power plants. The pipelines are in this case connected into networks, which serve for collecting solar energy in the solar power plant. In such a solar power plant, the radiant energy of the sun is concentrated by means of parabolic mirrors onto receivers. The combination of a parabolic mirror and a receiver is known as a collector. A row of collectors is connected in series to form solar loops. The radiation energy collected by the receivers is transferred to a heat transfer fluid. At present, a biphenyl-diphenyl ether mixture is used in particular as the heat transfer fluid, which however is limited in its maximum operating temperature by its decomposition temperature of about 400° C. To obtain higher operating temperatures, making greater efficiency possible, other heat transfer fluids are required. Particularly used for this purpose are molten salts, for example that known as solar salt, a mixture of sodium nitrate and potassium nitrate in a ratio of 60:40.

However, a disadvantage of molten salts is that they have a high melting point. For example, a sodium-potassium nitrate mixture melts in the eutectic system, that is to say in a mixing ratio of 44:56, at a temperature of 218° C. In long pipeline networks, as occur in solar power plants, it is difficult to operate reliably with molten salts that have high melting points. The freezing of the molten salt in pipeline systems can cause great commercial losses. The losses are caused, for example, by the great volumetric expansion of molten salts when they melt. There is the risk of fittings and pipelines being subjected to pressure and greatly damaged.

When the molten salt freezes, which mainly takes place at times when the solar power plant is not operating, i.e. at times when the sun is not shining, there may be a volumetric contraction, which may lead to a different state of solidification, depending on the pipeline assembly and the operating state. It is likely that bubbles which are generally evacuated will occur in the pipeline and come together to form units of varying sizes. When remelting occurs, if there happens to be a great spatial distance between the locations where melting occurs with volumetric expansion and the evacuated regions, there may not be sufficient volumetric equalization to reduce the pressures occurring.

In order to prevent freezing of the molten salt, it is customary at present to drain the pipeline system during prolonged downtimes. Alternatively, it is also possible to heat the pipeline system. For this purpose, electrical energy or heat from available heat reservoirs may be used for example. If heat from available heat reservoirs is used, usually a hot heat transfer fluid is pumped through the pipeline system. These methods have the disadvantage that considerable amounts of energy in the form of electrical energy or in the form of thermal energy have to be consumed for this.

If electrical heating is provided, this is usually realized at present by laying along with the pipelines highly temperature-resistant mineral-insulated electrical heating conductors. This technique cannot be used, however, in the case of solar receivers such as are used in parabolic-trough solar power plants, since the individual receivers are thermally insulated very well from the surroundings by an evacuated glass casing. At present, receivers are therefore electrically heated by a current of high intensity being applied at a low voltage to the pipeline system itself. This has the disadvantage, however, that varying transfer resistances or thermal losses may occur at the pipeline connectors. There is an increased occurrence of electrical heat at the locations with a high resistance. Then there is the risk of heating not being uniform and the temperature locally failing to reach the melting temperature of the salt that is used as the heat transfer medium.

Internal heating conductors are known and widely used, for example in Scandinavia for the frost protection of water pipeline systems. In this case, an insulated electrical heating conductor is loosely laid in the pipeline system to be protected. When there is the risk of frost, the heating conductor prevents the pipelines from freezing. This method is thermally more efficient than heating from the outside. However, such heating conductors placed into the pipeline cannot be used for pipelines carrying molten salt. Apart from the much higher operating temperature and the oxidizing conditions of a molten salt, the internal conductor in water systems provides protection from volumetric expansion during freezing. As a difference from this, however, the volumetric expansion of molten salts does not occur during freezing but during melting.

In particular before operation commences, it is necessary to heat the pipeline system that is carrying the salt. If, for this purpose, a voltage is applied to the pipeline system itself, it is necessary before the solar power plant is put into operation to bring the entire steel mass of the pipeline system to a temperature well above the melting point of the salt. A great amount of energy is required for this purpose.

In order to handle solar power plants with long pipelines without the molten salt solidifying, it is being attempted at present to use salts that melt at a lower temperature as an alternative to solar salt. This has the disadvantage, however, that the salts have a lower thermal stability and restrict the operating range to temperatures below 500° C. This leads to lower efficiency of the solar power plant in comparison with solar salts.

It is also necessary to keep the lower-melting heat transfer salts within closed systems, which causes additional expenditure since inerting systems have to be laid in the solar array. Inerting is necessary in particular whenever nitrite-containing mixtures are used as the heat transfer salt, since, in the presence of air, the nitrite can oxidize with oxygen to form nitrate, and consequently the solidification of the salt can rise in an uncontrolled manner. If calcium-containing salt mixtures are used, the calcium may react with carbon dioxide that is contained in the air to form insoluble calcium carbonate.

Furthermore, the addition of nitrates of the elements lithium, rubidium and cesium may cause the melting point of solar salt to be lowered. However, these salts are only obtainable on a small scale and are not available cost-effectively in the amounts such as are required for solar power plants, particularly those with heat reservoirs.

BRIEF SUMMARY OF THE INVENTION

It is an object of the invention to provide a pipeline for carrying a molten salt that allows heat transfer salt that has solidified in the pipeline to melt again without causing damage to the pipeline. It is a further object to reduce the heat dissipation of a solar array when it is not in operation, for example overnight, by lowering the operating temperature of the heat transfer salt.

The object is achieved by a pipeline for carrying a molten salt, with a pipe wall that is stable with respect to the temperatures occurring, a heating conductor being provided inside the pipeline for heating, the heating conductor not lying against the inner wall of the pipeline.

The use of a heating conductor inside the pipeline makes it possible for salt that has solidified along the heating conductor within the pipeline to be melted uniformly, so that there forms around the heating conductor a channel through which molten salt can be transported away. This avoids excessive pressures being exerted on the pipeline as a result of the volumetric expansion of the molten salt. A uniform temperature distribution along the heating conductor also has the effect that the salt around the heating conductor melts at the same time over the entire length of the pipeline, and so there also forms a channel through which the molten salt can flow and thus the pressure can be equalized.

The pipeline according to the invention through which a heating conductor is passed is used in particular in the case of solar power plants, for example parabolic-trough solar power plants. In such solar power plants, the pipelines generally run substantially horizontally, i.e. with a gradient of less than 5°, usually of less than 1°.

Individual pipelines in such a solar power plant each have sections that are free from curvature with a length of at least up to 100 m, usually up to 300 m. The large straight sections make it possible to place a heating conductor in the pipe without it having to be passed through bends.

In a preferred embodiment, the heating conductor is arranged off-center in the pipe, the distance of the heating conductor in the downward direction being greater than in the upward direction in the case of pipeline section running with a maximum gradient of 45°. Laying the heating conductor off-center in the pipe avoids the heating conductor touching the inner wall of the pipeline as a result of sagging regions of the heating conductor between two points of attachment if there is a temperature-induced linear expansion of the heating conductor. Also in the case of sagging, it is necessary that the heating conductor does not have direct contact with the inner wall of the pipeline. To attach the heating conductor, it is possible, for example, for it to be passed through eyelets in the pipeline through which the molten salt flows.

In the case of a gradient of more than 45°, in particular in the case of vertically running pipeline sections, it is preferred if the heating conductor runs centrally in the pipeline.

To avoid the heating conductor that has become extended in its length as a result of the high temperature being carried along with the molten salt, and in particular tensioned at the beginning of the pipeline, seen in the direction of flow, it is preferred to apply an insulator to the heating conductor, and so attach the heating conductor with the insulator in the eyelet. This ensures that the heating conductor is always attached at the same location in the eyelet. It avoids the heating conductor being pulled through the eyelets as a result of the flowing molten salt. This in turn makes it possible to avoid tearing of the heating conductor caused by stresses occurring during cooling, when the heating conductor contracts again. The contraction of the heating conductor may lead to problems in particular if the part that is carried along when the molten salt solidifies is fixed in the solidified salt and the heating conductor can no longer move.

As an alternative to attachment of the heating conductor by an eyelet, it is also possible for the heating conductor to be attached by resilient spacers inside the pipe. Here it is preferred in particular to attach the heating conductor in each case by at least three, preferably four, spacers in the pipe wall, which are attached to the heating conductor in a crosswise manner. The spacers may be attached to the pipe wall, for example, releasably by screws or unreleasably by a welded connection. It is preferred, however, not to connect the spacers to the pipe wall. In this case, the conductor is fixed inside the pipeline by the spacers in addition to the eyelets.

In a further alternative embodiment, the heating conductor is provided with loops, which are suspended in attachment hooks in order to attach the heating conductor in the pipeline. Provision of the loops achieves a way of attaching the heating conductor that avoids the heating conductor being displaced by the flowing molten salt. The loops may be attached to the heating conductor, for example, by welding. For this purpose, it is possible, for example, to draw over the heating conductor a sleeve, which is welded to the heating conductor, and to provide the loops on the sleeve. Apart from welding onto the sleeve, it is also possible to use a clamping sleeve, which is, for example, clamped together with the heating conductor.

In order, when the salt melts, to form as quickly as possible a channel through which the molten salt can flow, it is preferred to design the heating conductor in the form of a tube or a channel of any desired cross section and to provide the wall of the tube or the channel with openings through which molten salt can flow into the interior of the heating conductor designed in the form of a tube or channel and be transported inside the heating conductor.

Apart from a solid outer wall which is provided with openings, it is alternatively also possible for the heating conductor to be designed, for example, as an annular knit or weave. Also in this case, a hollow space through which already molten salt can flow is formed inside the weave or knit.

As an alternative to designing the heating conductor as a hollow body inside which there is formed a channel through which the molten salt can flow, it is also possible for the heating conductor to have at least one u-shaped or v-shaped depression extending in the axial direction. The salt will melt first in the depression, so that the depression forms a channel through which the molten salt can flow. A heating conductor with more than one u-shaped or v-shaped depression may, for example, have a star-shaped cross section. It is also possible, for example, for such a heating conductor to be designed in the form of a channel with a u-shaped cross section.

Apart from a hollow body or a heating conductor which has at least one u-shaped or v-shaped depression, it is also possible furthermore, for example, to provide a solid electrical conductor which has a wire mesh wrapped around it. In this case, the molten salt may flow first in the wire mesh, before a channel surrounding the heating conductor has formed outside the wire mesh.

Apart from the aforementioned possibilities, it is of course also possible for the heating conductor to be a solid wire or be designed in the form of a cable. The heating conductor may also be formed from a material of good electrical conductivity, for example copper or aluminum, which is enclosed by a corrosion-resistant casing. This avoids corrosion of the material of good electrical conductivity in the presence of the salt that flows through the pipeline, causing the heat transfer salt to be contaminated and lose its thermal resistance.

Furthermore, it is also possible to use a conventional conductor, for example with a current-carrying core and electrical insulation, as the internal heating conductor a corrosion-resistant casing being additionally applied to the electrical insulation. A protective metal casing as a corrosion-resistant casing may in this case also serve as a return conductor for the current. Alternatively, a two-core arrangement with an insulated outer casing of high-grade steel can also be used. Such insulated heating conductors may also lie against the wall of the pipeline.

If a stiff conductor, for example a rigid rod, is used, one or more expansion regions are provided to allow compensation for expansions caused by temperature fluctuations during operation. An advantage of using a stiff conductor is that it requires fewer holders within the pipeline system than a flexible conductor, such holders preventing displacement in the direction of flow.

The conductor may also be made up of segments, for example one segment per receiver, which are connected to one another in an electrically conducting manner during assembly, for example by screwing, welding or clamping. The segmental construction also offers a concept for replacing a receiver within a row by cutting and re-connection. The connections must be designed in such a way that sufficiently low transfer resistances are realized.

If the heating conductor takes the form of a cable, one or more stranded conductors are twisted to form a cable. The cable preferably comprises multiple stranded conductors. The twisting of the stranded conductors to form a cable produces an interstitial channel in the middle of the cable, through which already molten salt can flow and can thus equalize the pressure. Twisting a cable with a stranded conductor can produce a spiral winding which has an interstitial channel in its middle. A further advantage of using a cable is that the horizontal compensation for the thermal expansion can be made easier. Moreover, it is possible to set the stiffness of the conductor by the kind of stranding, so that, with corresponding twisting, the cable has a strength approaching the strength of a rigid conductor. This allows a smaller number of holders that secure the cable against displacement in the direction of flow to be provided.

The stranded conductors from which the cable is twisted may take the form of wires, that is to say be solid, or else take the form of tubes. If the stranded conductors take the form of tubes and are not filled with highly electrically conductive material or a flowing heat transfer medium, they are respectively closed at the ends, preferably by welding. The individual tubes are preferably filled with a gas, for example air. The gas in the tubular stranded conductors has the effect of increasing the ascending force in the molten salt. This allows a reduction in the holding force of the springs required for fixing near the middle of the tube. The lowest descending forces occur when the mean density of the tubular stranded conductors corresponds to the density of the molten salt of 1800 kg/m$^3$. The tubular stranded conductors may have a circular cross section or a non-circular cross section. A non-circular cross section is, for example, an oval or elliptical cross section. In the case of a non-circular cross section, it is possible that locally occurring increased forces during the melting of the salt can be elastically absorbed better. Moreover, non-circular cross sections have the effect of increasing the cross section of the interstice, and thereby facilitate the pressure equalizing flow in the interstitial channel. In order to obtain a non-circular cross section, it is possible for example to produce tubes for forming the stranded conductors and flatten them, for example by rolling. A further possibility for forming a stranded conductor with a non-circular tube is a kidney-shaped cross section. The kidney-shaped cross section, which is obtained for example by the compressive twisting of round tubes over a round forming mandrel, has the effect of creating a particularly large interstitial channel between the stranded conductors. Since the stranded conductors are accommodated in a molten salt, it is advantageous to subject the mechanically deformed parts to stress-free annealing in order to minimize the risk of corrosive attack.

In the case of a tubular design of the stranded conductors, it also possible as an alternative or in addition to the electrical heating to use a liquid or gaseous heat transfer medium which flows through the tubular lines.

If the pipeline is used as a pipeline in a solar array of a parabolic-trough solar power plant, the pipeline usually comprises an inner pipe, through which the molten salt flows, and an outer casing of glass. The intermediate space between the inner pipe and the outer casing of glass is evacuated. The surface of the inner pipe is usually designed so as to absorb the solar radiation and to be heated up in this way. The heat is then transferred from the inner pipe to the heat transfer medium that is flowing through the pipes. These regions are generally also known as receivers.

In a solar power plant, the pipelines usually run in a u-shaped manner, one leg of the pipeline being connected to an inflow and a second leg being connected to an outflow. The legs of the pipeline extend without curvature over a distance of usually at least 100 m, preferably over at least 300 m. On the side opposite from the inflow and the outflow, the two legs are connected to one another by way of a crossing piece of pipe. The molten salt then flows via a bend into the crosspiece and from the bend into the parallel lying second pipeline, forming the second leg. In a preferred embodiment, the pipe bends for flow deflection each have a pipeline section that continues in the direction of the pipeline, the pipeline section being closed by a closure and the heating conductor being passed through the closure of the pipeline section. In order that the pipeline is not subjected to any stress during the operation of the insulated heating conductor, the heating conductor is usually passed through the closure of the pipeline with an insulation. The insulation serves at the same time for sealing.

The closure of the pipeline section may be configured, for example, as a blind flange. Any other desired cover that withstands the pressure occurring in the pipelines may also be used. However, a blind flange is preferred.

Irrespective of the type and form of the heating conductor, a round rod is preferably attached to the end of the heating conductor. This rod may be connected to the heating conductor, and connected in an insulating or non-insulating manner to the pipeline, for example by a welded connection, a screwed connection or a clamped connection. The connection must in this case be designed such that the round rod is connected to the heating conductor with good electrical conductivity. If the closure of the pipeline section is a blind flange, to obtain attachment for example in an electrically insulating or non-insulating manner the round rod is guided and attached in a stuffing-box construction. In order to prevent electric current being conducted to the pipes in the case of the insulated heating conductor, the stuffing-box packing of the stuffing-box construction is configured in an electrically insulating manner. The stuffing-box packing achieves a gap between the round rod and the lead-through of the heating conductor into the pipeline. A low voltage of up to 0.7 V may be applied over the gap. In spite of the low voltage, there is a high electric field strength in the gap and in the vicinity of the gap. This high electric field strength brings about a current flow to and over the pipeline wall if the pipeline system is filled with electrically conducting molten salt.

Complete electrical insulation of the internal conductor inside the pipeline near its lead-in, for example by means of the blind flange, prevents an undesired current flow. The electrical insulation may be built up for example in the region of a stuffing box or in the region of a flat gasket. If a flat gasket is used, electrically insulated screwed unions must also be used.

Since materials used for electrical insulation are generally not resistance to the temperatures which prevail inside the pipelines as a result of the molten salt that has melted, it is possible to produce a temperature gradient by suitable thermal insulating materials. For example, it is possible to include a fibrous material for thermal insulation in the region of the blind flange in the pipeline. A quartz fiber weave may be used for example as the fibrous material. The round rod to which the heating conductor is attached is passed through an electrically insulating and high-temperature resistant sleeve, for example made of ceramic or silicon carbide. The first sleeve of ceramic or silicon carbide is adjoined by a second electrically insulating sleeve, which no longer has to be resistant to such high temperatures. Polytetrafluoroethylene (PTFE) or other high-temperature plastic is suitable for example as the material for the second sleeve. The two electrically insulating sleeves are enclosed by a further sleeve, which ends in a flange. The flange is closed by an electrical insulation with a second flange. A stuffing box which is sealed with a seal is used for leading the round rod through the closing flange. The insulating materials that are used have the effect that the temperature in the region of the stuffing box is so low that the seal can be produced from a standard material.

If the solidified salt in the pipeline is to be melted, the heating conductor may only produce a small amount of heat in the region of the lead-in in order not to put at risk the formation of a temperature gradient. This can be achieved, for example, by the heating conductor having a lower electrical resistance in the region of its lead-in into the pipeline than in the actual heating zone. The lower electrical resistance can be achieved, for example, by the round rod into which the heating conductor opens being configured with a greater diameter than the heating conductor in the heating zone. As an alternative and in addition, the heating conductor may comprise a material with particularly good electrical conductivity in the region of the lead-in into the pipeline, in order to avoid heating up of the heating conductor in the region of the lead-in into the pipeline. A suitable material with good electrical conductivity is, for example, copper or aluminum. In the region of the lead-in, the heating conductor may be produced here completely or partially from the material with good electrical conductivity. For example, it is possible to design the heating conductor in the region of the lead-in such that it comprises a solid copper core.

As an alternative to a round rod, a rod with a different cross section may also be used. However, a round rod is preferred.

The internal conductor may also be installed in the pipeline system in a non-insulated manner. In this case, the lead-in may not include any insulating measure. This is of advantage in particular whenever, for example, individual pipeline sections of a solar loop are not connected to another by flange connections but are welded to one another. Then it is no longer possible to control the electrical resistance of the entire pipeline by insulation of the individual pipeline sections. If the heating conductor is not electrically insulated from the pipeline sections welded to one another, application of a voltage causes currents to flow through the individual pipeline sections and the internal conductor with a ratio which is proportional to the ratio of the conductivity of the pipeline to the conductivity of the heating conductor. Corresponding to the ratio, heat is generated on the pipeline and on the heating conductor. By choosing an adequate cross section of the heating conductor and choosing material with very good electrical conductivity for the heating conductor, for example copper or aluminum, the resistance of the heating conductor can be lowered and the conductivity increased to such an extent that the current is led into the internal conductor sufficiently strongly and the development of heat is concentrated on the heating conductor provided inside the pipeline to such a degree that the internal heating conductor is heated up more quickly than the pipeline. It is conducive for quicker heating up of the internal conductor that the pipeline has a generally much greater mass, and consequently much higher heat capacity, than the internal conductor.

In the case of such an arrangement with an uninsulated heating conductor, no potential differences between the heating conductor and the pipeline occur over the entire pipeline. The pipeline can be electrically insulated with respect to the apparatus framework that carries the pipeline.

In order that the heating conductor is not damaged by the molten salt flowing through the pipeline, it is preferably produced from a material that is corrosion-resistant with respect to the salt used, in particular with respect to nitride. Alternatively, it is possible, as already described above, to provide the heating conductor with a corrosion-resistant casing. If the heating conductor is produced from a corrosion-resistant material, high-grade steel is particularly suitable, for example preferably the steels of the type St 1.4571 and St 1.4541, but also St 1.4301 or nickel-based steels such as St 2.4856.

If a high-grade steel, for example St 1.4571, is used, there initially forms on the heating conductor a passivating, corrosion-inhibiting metal oxide/nitride film about 15 μm thick, which offers an appreciable resistance to the current flow. The resistance of the protective layer helps in controlling the potential of the heating conductor system. Even small electrical voltages on conductive salts can trigger electrode processes that lead to corrosive deposits. Electrode processes may commence from a certain limit voltage. The corrosion-inhibiting protective layer causes protection by overvoltage and thus increases the decomposition voltage of the system.

Use of the heating conductor inside the pipeline allows command to be maintained over high melting points of the heat transfer medium used in the pipeline. This opens up the possibility of also using as the heat transfer medium salt mixtures which have a higher melting point then salt mixtures previously discussed. For example, nitrate mixtures which comprise sodium nitrate as the main component may be used. This has the advantage that potassium reserves that can be used for the production of potash fertilizers can be largely spared. Currently, "Solar Salt 60" comprises 60% by weight sodium nitrate and 40% by weight potassium nitrate. The proportion of sodium nitrate in the salt can be increased to 80% by weight or even to over 90% by weight and more. The melting point of the salt increases accordingly from 235° C. in the case of a mixture of 40% by weight potassium nitrate and 60% by weight sodium nitrate to 273° C. in the case of a mixture of 80% by weight sodium nitrate and 20% by weight potassium nitrate and to 293° C. in the case of a mixture of 90% by weight sodium nitrate and 10% by weight potassium nitrate. If pure sodium nitrate is used, the melting point is at 306° C.

Apart from the stoichiometric composition of the molten salts, the internal conductor has great advantages in connection with these molten salts. The solidified high-melting crystals are heavier than the surrounding molten salt and sink to the bottom of the pipeline. The sinking rate for large crystallites is greater than for small crystallites. Attachment of the crystallites to the pipe wall and the covering thereof is conceivable, but has not been observed so far in well-insulated pipes. If the pipes have a gradient, high-melting crystallizate becomes separated at the lower-lying points. The extent of the separation depends here on the quality of the insulation of the pipeline. Very well-insulated pipelines in which the melt solidifies slowly over a long period of time may exhibit greater separation than less well-insulated pipelines.

However, the sinking, high-melting crystals do not succeed in completely displacing low-melting melt. Rather, in the lower-lying regions of the pipelines there forms an accumulation of high-melting crystallites, though still with low-melting material in their interstices. When solidifying is complete, there forms from this an inhomogeneous mixture of crystallites with different melting temperatures.

If this mixture is heated, initially the crystallites with the low melting point melt. The melt obtained first completely wets the composite structure of the crystallites with a higher melting temperature. The two-phase mixture obtained initially loses scarcely any of its mechanical stability. Only when part of the supporting crystallite composite structure with a higher melting temperature melts does the mixture go over into a pumpable form. For use in solar power plants, this means that pipelines with solidified molten salt in them must be heated beyond the intended melting point—in the case of Solar Salt 60 of 242° C.—before innocuous pumpability can be achieved.

By selective crystallizing of crystallites containing a high proportion of sodium nitrate and sinking thereof to lower-lying regions of the pipeline, the remaining molten sodium nitrate is depleted. This depletion even continues until the eutectic concentration ratio is reached in the melt. At this concentration ratio, the residual melt in the upper region of the pipeline system then solidifies.

Use of the heating conductor inside the pipeline allows economical and reliable melting of such solidification morphologies to be accomplished.

Particularly in the case of horizontal pipeline routing, the heating conductor can be specifically placed in the upper region of the pipeline. There it is surrounded by a mixture of crystallites which has an increased proportion of crystallites with a low melting temperature, that is those of the eutectic system. In addition, a multiplicity of voids can be found in the upper region of the pipeline. A melt channel can be created relatively easily there, possibly reducing horizontal differences in pressure that occur during heating up.

On account of the solidification morphology, for example of Solar Salt 60 as described above, it is scarcely possible to define meaningful melting points for a molten salt of a salt mixture. For instance, melting already begins at a temperature of 221° C., but the last crystals only disappear at a temperature above 280° C.

Since, along with the actual pipeline section, the pipeline usually also comprises fittings, for example valves, it is necessary also to heat the valves correspondingly in order to ensure their function and also not to destroy them by expansion of the molten salt during melting. In order to heat a valve, it is possible for example to heat the region of the static closing element directly from the internal heating conductor, and thereby to melt the salt in the valve. In this case, the heating conductor is connected directly to the static closing element from both sides of the valve. If resistance matching is required there, a good electrical conductor in the form of a ring may be placed around the static closing element. The ring is in this case preferably fitted in the valve body in such a way that it does not weaken load-bearing parts of the valve construction. As a result of the electrical insulation with respect to the valve body, heat of the heating conductor that is released is concentrated on the seat of the valve. Alternatively, it is also possible to produce a ring from a material with very good electrical conductivity, for example copper. The heating ring in the valve is preferably made to match in its resistance value the value of the heating conductor. Here, the ring forms part of the heating conductor in the region of the valve. Apart from using a valve, an analogous construction with other fittings can be used, for example in the case of flaps or slides. The ring in that case respectively has the geometrical form of the lead-through through which the molten salt flows.

BRIEF DESCRIPTION OF THE SEVERAL VIEWS OF THE DRAWINGS

Exemplary embodiments of the invention are explained in more detail in the description which follows and are represented in the figures, in which:

FIG. 13 shows a cross section through a pipeline section with a number of segments, FIG. 14 shows how parasitic currents pass between the heating conductor and the pipe wall, FIGS. 15A to 15E show cross sections of different heating conductor geometries, FIG. 18 shows a section through the pipeline along the line A-A' in FIG. 17, and FIG. 19 shows a section through the pipeline along the line B-B' in FIG. 17.

DETAILED DESCRIPTION OF THE INVENTION

Figure 1:
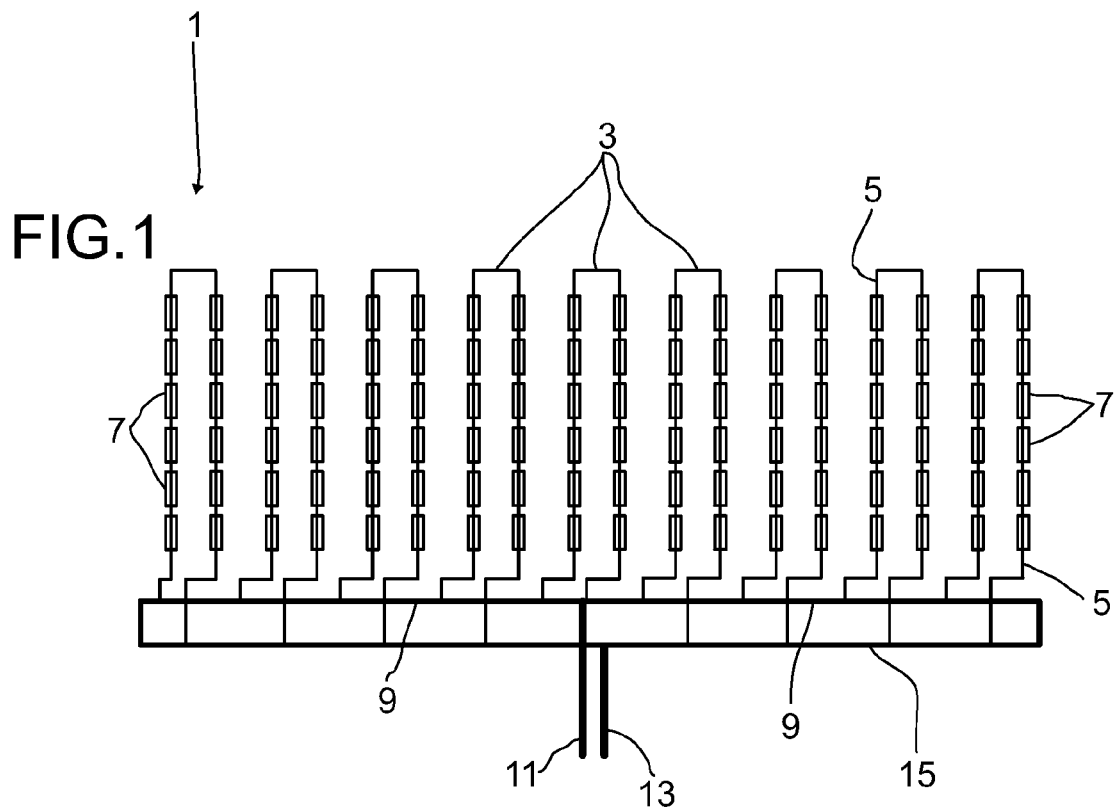
FIG. 1 shows a schematic representation of a solar array of a parabolic-trough solar power plant.

FIG. 1 shows a schematic representation of a solar array of a parabolic-trough solar power plant.

A solar array 1 of a parabolic-trough solar power plant has a number of solar loops 3. The solar loops 3 are each formed by a pipeline 5, through which a heat transfer medium flows. Used according to the invention as the heat transfer medium is a molten salt, preferably solar salt, i.e. a mixture of potassium nitrate and sodium nitrate in a ratio of 40:60, or as a eutectic system with a mixing ratio of 44:56.

In the solar loops 3, the heat transfer medium is heated by means of irradiating solar energy. For this purpose, the pipelines 5 are segmentally enclosed by a glass tube 7. The space between the pipeline 5 and the glass tube 7 is evacuated. Underneath the glass tubes 7 there is also a parabolic trough, in which irradiating sunlight is reflected and directed onto the glass tube 7. The incident radiation on the glass tube 7 causes heat to be conducted to the heat transfer medium that flows through the pipeline 5, as a result of which the heat transfer medium is heated up.

The heat transfer medium flowing through the pipelines 5 of the solar loops 3 flows into a collector 9 and from the collector 9 on into a heat transfer outflow 11. The heat transfer medium flowing through the heat transfer outflow 11 is usually made to pass into a heat exchanger, in which the latter gives off heat to a steam circuit, which is used for example to operate turbines for power generation. The cooled heat transfer medium leaving the heat exchanger is made to pass via a heat exchanger inflow 13 into a distributor 15 and from the distributor 15 into the pipelines 5 of the solar loops 3.

On account of the high melting point of a molten salt, said salt generally solidifies when the solar power plant is not being operated. This is always the case, for example, whenever too little sunlight irradiates the parabolic troughs, for example at night. Operation must also be suspended, for example, when maintenance work has to be carried out.

Figure 2:
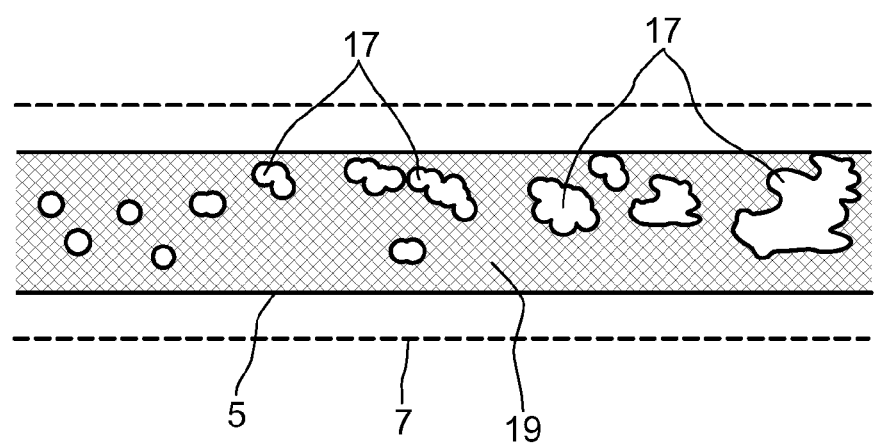
FIG. 2 shows a pipeline section with frozen molten salt.

During inoperative times, the molten salt flowing through the pipelines 5 may solidify. This is shown in FIG. 2 by way of example for a pipeline section.

When the molten salt solidifies in the pipeline 5, there is generally a volumetric contraction. This has the effect that evacuated bubbles 17 are produced in the pipeline 5. The evacuated bubbles 17 are in this case located within the solidified salt 19.

If it is attempted to melt the solidified salt, it is possible that, if there happens to be a great spatial distance between the locations where melting occurs with volumetric expansion and the evacuated bubbles 17, there may not be sufficient volumetric equalization to reduce the pressures occurring. The volumetric expansion caused by the melting of the salt may then result in the pipeline 5 been damaged.

Figure 3:
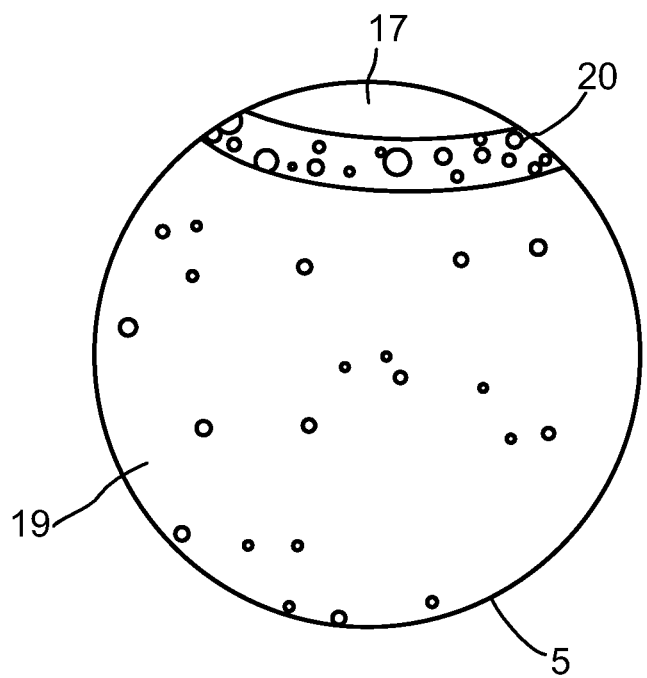
FIG. 3 shows a section through a pipeline with Solar Salt 60 solidified in it.

The morphology of solidified Solar Salt 60, that is to say a salt mixture of 60% by weight sodium nitrate and 40% by weight potassium nitrate, is shown by way of example in FIG. 3.

When Solar Salt 60 solidifies, initially crystallizate enriched with sodium nitrate and having a melting temperature of about 280° C. solidifies at about 244° C. The sodium nitrate forms crystallites which sink downward within the pipeline section 47. Here, the sinking rates is dependent, inter alia, on how large the crystallites become. The size of the crystallites depends on the solidifying rate. On account of the sinking of the crystallites of sodium nitrate, the concentration of crystallites decreases upwardly within the pipeline section 53. On account of the volume contraction of the salt, isolated voids form within the solidified salt 19. On the surface of the solidified salt 19 forms a foam-like region 20, in which the eutectic composition of the Solar Salt 60 is solidified. This region generally does not comprise any sodium nitrate crystallites. Above the foam-like region 20 there forms an evacuated bubble 17. The crystallizate accumulates in the lower regions of the region of the pipeline that is accessible to flow. Voids form with preference in upper regions of the region that is accessible to flow.

In order to obtain uniform melting of the molten salt within a pipeline 5, according to the invention a heating conductor 21 with a uniform resistivity is laid through the pipeline 5. This is shown by way of example in FIG. 4.

According to the invention, the heating conductor 21 is provided inside the pipeline 5. The heating conductor is in this case formed, for example, as an electrical resistance wire. If a voltage is applied, the heating conductor 21 heats up and the salt surrounding the heating conductor 21 melts to form a channel surrounding the heating conductor 21.

The heating conductor 21 is supplied by way of a main voltage supply 23. A supply line 25 for the heating conductor 21 branches off from the main voltage supply 23. In a transformer 27, the supply voltage is transformed to the voltage necessary for heating the molten salt in the pipeline 5. It is possible to connect a number of heating loops to one voltage supply. The voltage supply is connected to the loops one after the other and the loops are heated up one after the other.

To make simple assembly of the heating conductor 21 possible, it is preferably led out of the pipeline 5 at the end of one leg of the pipeline 5 running in a u-shaped manner and is connected in an electrically conducting manner to the heating conductor that is led out from the second leg. This makes it possible to avoid complex laying, in particular in the case of movable collector pipelines 5, which require many supports for the heating conductor 21.

It is particularly preferred to use for the heating an electrical heating circuit with a floating alternating potential, which is generated by an ungrounded transformer 27. A floating alternating voltage offers advantages in terms of safety. For instance, an insulating fault in a loop can be tolerated.

The receivers themselves must be held in an electrically insulated manner. The receivers must also be insulated with respect to one another. A resistance of the insulator that is greater than the resistance of the heating conductor by a factor of 10 is generally sufficient. For example, on the basis of the preferred small resistance of the heating conductor of less than $0.1\Omega$ over a receiver, a resistance of one ohm is generally already adequate for sufficient insulation. The insulating state of the heating conductor may, for example, be monitored by an online resistance measurement.

Figure 5:
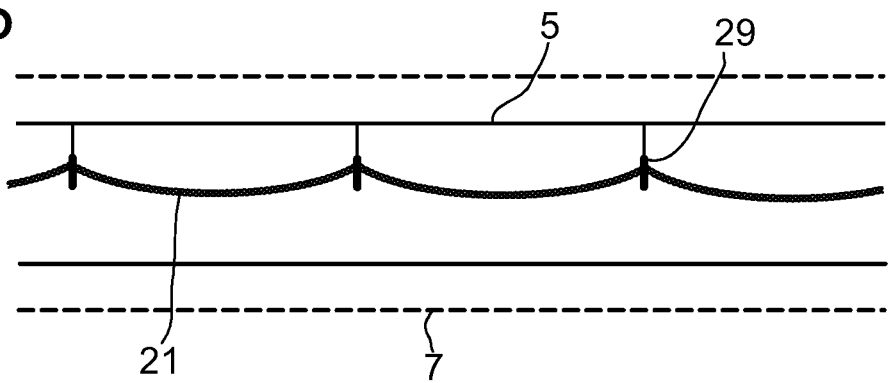
FIG. 5 shows a pipeline section with a heating conductor running in it.

A pipeline section with a heating conductor running in it is shown in FIG. 5.

The heating conductor 21 is attached in the pipeline 5, for example, in a suspended manner, as shown in FIG. 5. For this purpose, it is possible, for example, to pass the heating conductor 21 through eyelets 29. The eyelets 29 are in this case attached, for example, in a suspended manner on the upper side of the pipeline 5.

The heating conductor 21 is preferably provided off-center in the pipeline 5, the distance from the upper side of the pipeline 5 being chosen smaller than the distance from the underside of the pipeline 5. The off-center laying of the heating conductor 21 avoids the heating conductor 21 coming into contact with the pipe wall during heating, and accompanying linear expansion. The sagging of the heating conductor 21 is in this case strongly dependent on the temperature. The higher the temperature, the greater the linear expansion, and the greater the heating conductor 21 sags.

Apart from the attachment with eyelets 29 shown in FIG. 5, it is alternatively also possible, for example, to use resilient spacers. The resilient spacers are in this case preferably arranged in a crosswise form in the pipeline 5 and the heating conductor 21 is provided at the intersection of the cross.

A further advantage of the off-center arrangement of the heating conductor 21 in the upper region of the pipeline 5 is also that the evacuated bubbles 17 usually occur in the upper part of the pipeline 5. During the heating up of the heating conductor 21 and the accompanying melting of the salt in the pipeline 5, a liquid channel is quickly formed along the heating conductor 21. Through this channel that is formed, pressures that may occur due to volumetric expansion during the melting can be dissipated to the evacuated bubbles 17, acting with a relieving effect.

Figure 6:
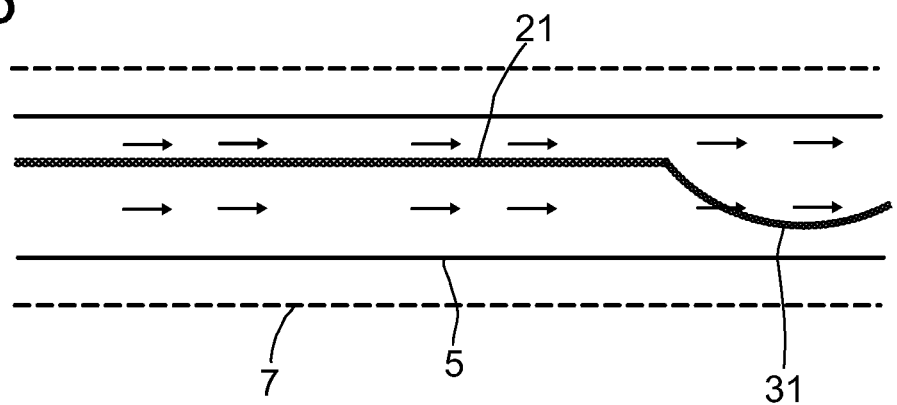
FIG. 6 shows the effect of a flow through the pipe on an unattached heating conductor.

If the heating conductor 21 is not attached in the eyelets 29, this may have the effect, however, that the heating conductor 21 is carried along by the molten salt flowing through the pipeline 5 until it is tensioned in the pipeline 5. This is shown by way of example in FIG. 6. Only at the end, i.e. directly upstream of a fixing point of the heating conductor 21, there forms a large loop 31, which may possibly also touch the pipeline 5.

A further disadvantage of the tensioning of the heating conductor 21 with the formation of the loop 31 is that, in the event of the molten salt solidifying, such a displacement of the conductor can lead to very great mechanical loading of the heating conductor 21, with subsequent mechanical damage. The heating conductor is fixed in its position when the salt solidifies and begins to shrink on account of the decreasing temperature of the molten salt. As a result, strong tensile forces act on the already tensioned part of the heating conductor 21.

In order to avoid such displacement of the heating conductor 21, it is preferably axially fixed in the pipeline 5.

Figure 7:
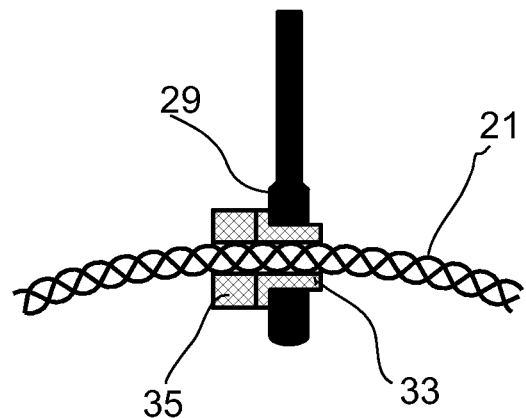
FIG. 7 shows an attachment of a heating conductor with an insulator in an eyelet.
Figure 8:
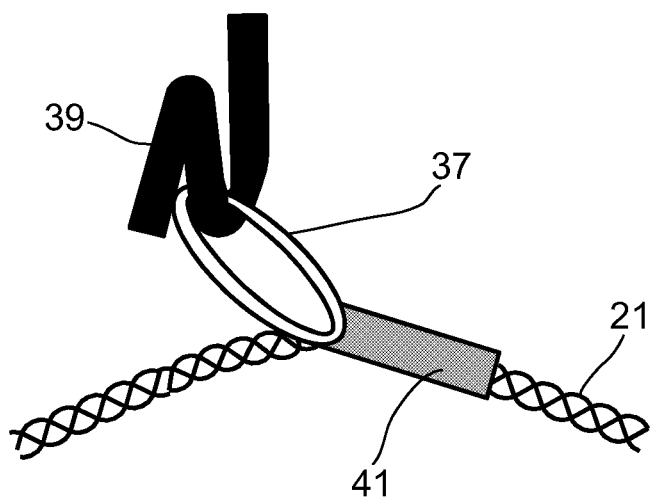
FIG. 8 shows attachment of a heating conductor with a loop on a hook.

Possible fixing of the heating conductor 21 is shown by way of example in FIGS. 7 and 8.

Attachment of a heating conductor in an eyelet with an insulator is shown in FIG. 7.

For the attachment of the heating conductor 21, it is possible, for example, to provide the heating conductor 21 with an insulating sleeve 33. The insulating sleeve 33 is in this case connected to the heating conductor 21 in such a way that the insulating sleeve is not displaceable. For this purpose, it is possible, for example, to clamp the insulating sleeve 33 onto the heating conductor 21. Alternatively, it is also possible, for example, to connect the insulating sleeve 33 to the heating conductor 21 releasably, for example by screwing, or unreleasably, for example by welding.

The insulating sleeve 33 has a widening 35 on one side. For the attachment of the heating conductor 21 in the pipeline 5, the heating conductor 21 is passed with the insulating sleeve 33 applied to it through an eyelet 29 attached in the pipeline 5. The insulating sleeve 33 then lies with the widening 35 against the eyelet 29, so that the insulating sleeve 33 cannot slip through the eyelet 29. To avoid slipping through while operation is in progress, the widening 35 is positioned on the side of the eyelet 29 against which the heat transfer medium flows.

If it is intended to reverse the flow or operate the solar loop 3 in such a way that the heat transfer medium can flow in any direction, it is alternatively also possible to provide a further widening on the side opposite from the widening 35 once the heating conductor 21 has been passed through the eyelet 29.

An alternative attachment of the heating conductor 21 is shown in FIG. 8.

In the case of the embodiment shown in FIG. 8, a loop 37 is provided on the heating conductor 21. The loop 37 is suspended in a hook 39, which may, for example, be of a spiral design, as shown in FIG. 8. The spirally designed hook 39 has the effect of avoiding the loop 37 becoming detached while operation is in progress as a result of differing flow influences.

The loop 37 may, for example, be attached on the heating conductor 21 by means of a sleeve 41. The sleeve 41 is, for example, in this case a clamping sleeve that is connected to the heating conductor 21. The attachment of the sleeve 41 may take place, for example, by clamping or by welding or screwing.

It is particularly preferred if the sleeve 41 and/or the loop 37 are produced from an insulating material.

Figure 9:
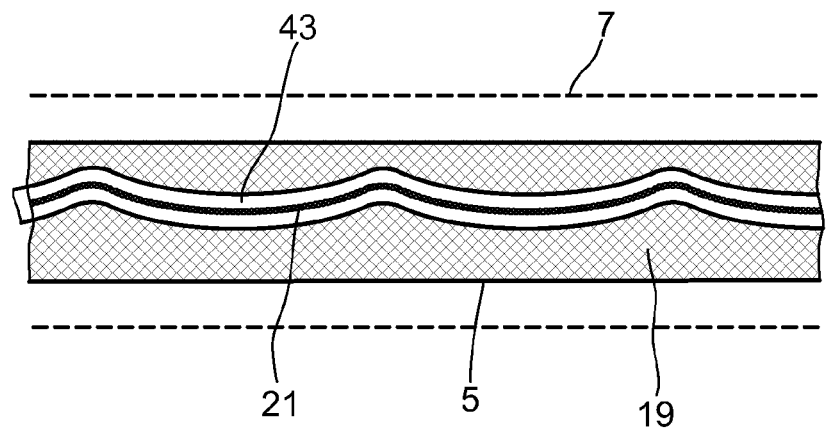
FIG. 9 shows formation of a channel in the solidified salt along the heating conductor.

The use of an insulating sleeve 33, such as that shown in FIG. 7, or a loop 37 and a sleeve 41 of an insulating material has the advantage that no current flow takes place from the heating conductor 21 to the sleeve 29 or the hook 39. In this way, parasitic currents that flow via the attachment of the heating conductor 21 to the pipeline 5 can be reduced. Formation of a channel in the solidified salt along the heating conductor is shown in FIG. 9.

If the salt in the pipelines 5 has solidified after an unwanted inoperative time of the solar power plant, for example when no power is generated at night, to resume operation the heating conductor 21 is first supplied with a voltage, whereby it is heated up. Around the heated-up heating conductor 21, the salt contained in the pipelines 5 begins to melt. If there is a uniform current flow in the heating conductor 21, the salt melts uniformly, and there forms a channel 43. The molten salt can flow through the channel 43, whereby pressures occurring on account of the increase in volume can be reduced as the salt melts.

Avoiding a buildup of pressure by allowing the salt to flow through the channel 43 has the effect of avoiding damage to the pipelines 5 when the solar power plant is put into operation.

Use of the heating conductor 21 also makes it possible to dispense with draining the pipelines 5, and consequently the entire solar array 1, when there is an unwanted inoperative time. It is also unnecessary to completely prevent the salt from solidifying as an alternative to draining the pipelines 5. The heating conductor must merely keep a sufficiently large flow channel free.

In addition, the internal heating conductor offers great advantages when restarting after draining of the loop. On the one hand, flow can be admitted to the pipeline system when only the heating conductor but not the pipeline system has reached a temperature well above the melting point. On the other hand, the uniform resistivity over the entire length of the heating conductor ensures an absence of cold spots.

Figure 10:
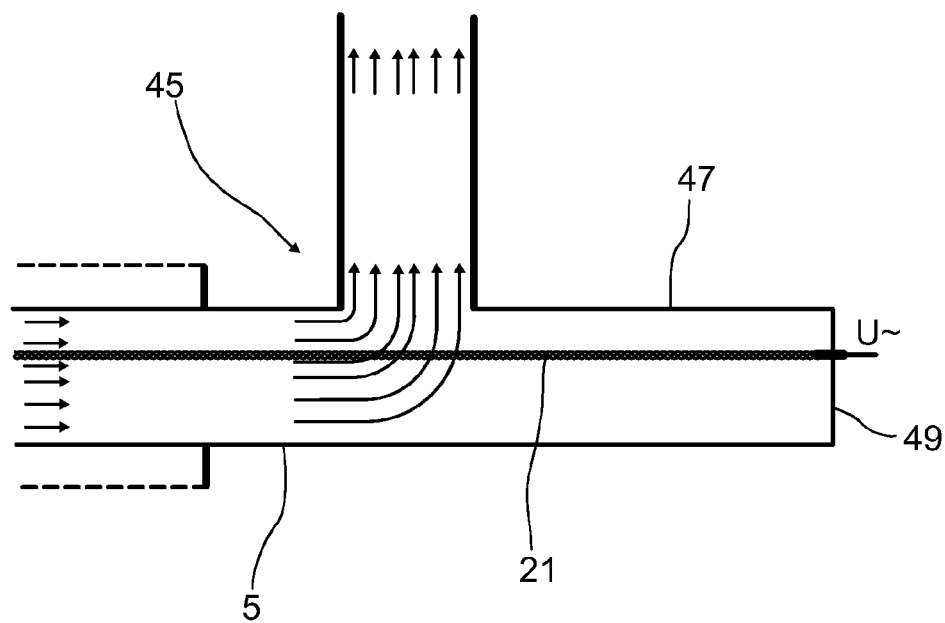
FIG. 10 shows attachment of a heating conductor in the region of a pipe bend for flow deflection.

Attachment of a heating conductor in the region of a pipe bend for flow deflection is shown by way of example in FIG. 10.

As can be seen from FIG. 1, a solar loop 3 is usually designed in a u-shaped manner. For this purpose, two pipelines 5 form the legs of the u-shaped solar loop 3, the pipelines 5 that form the legs being connected to one another on the side facing away from the collector 9 or distributor 15 by way of a crossing pipe. The molten salt flows through one leg of the u-shaped solar loop 3, then via the crossing piece of pipeline connecting the two legs and back to the collector 9 through the second pipeline 5. To avoid complex assembly of the heating conductor 21 in the region of the flow deflection of the molten salt at the end of the legs, it is advantageous to design a pipe bend 45 that is used for the flow deflection as a T piece and to provide it with a pipeline section 47 that continues in the direction of the pipeline 5. The pipeline section 47 is closed by a closure 49, and the heating conductor 21 is passed through the closure 49.

Suitable, for example, as the closure 49 for the pipeline section 47 is a blind flange.

Figure 4:
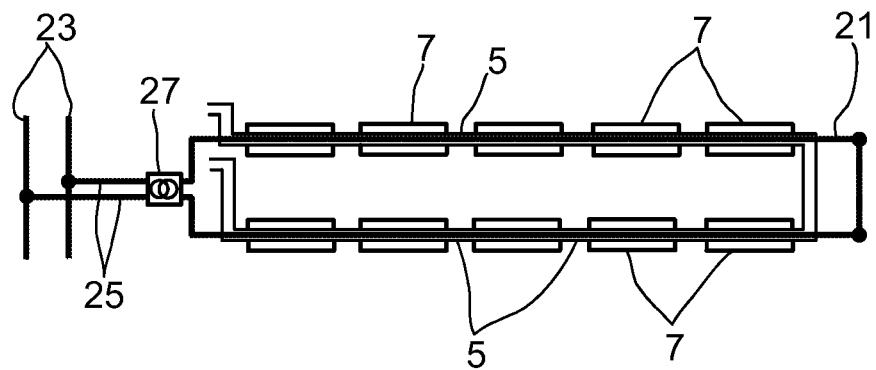
FIG. 4 shows an example of how a heating conductor runs in a solar loop.

To avoid a flow of current to the pipeline 5 via the pipeline section 47, the heating conductor 21 is passed through the closure 49 in an insulated manner. The heating conductor 21 passed through the closure 49 can then be connected to a suitable supply of electrical potential. It is alternatively also possible, as shown in FIG. 4, for two heating conductors of two adjacent pipelines 5 to be respectively connected to one another.

Figure 11:
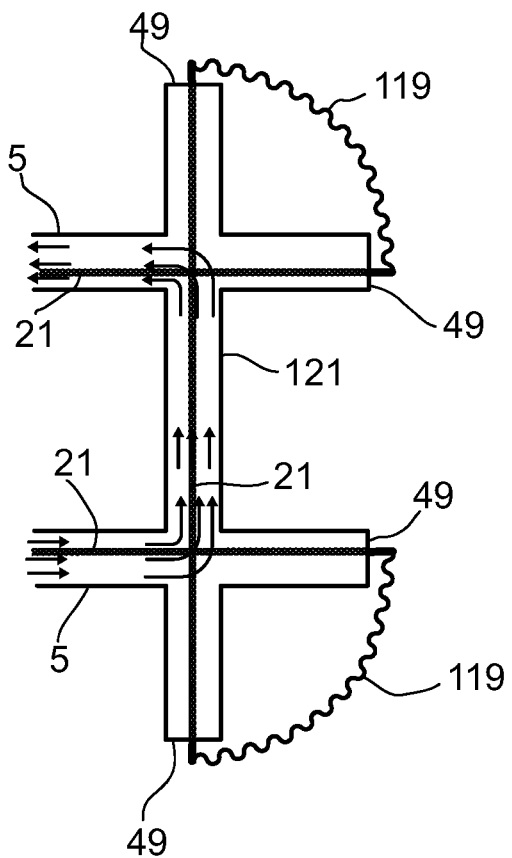
FIG. 11 shows how the internal conductor is provided at an end piece with a 180° bend.

A deflection of the molten salt over 180° through two pipe bends, as shown in FIG. 10, is shown in FIG. 11.

To make it possible for the inside of the pipe to be heated, first a heating conductor 21 is passed along the pipeline 5 in an insulated manner through the closure 49. A pipeline section 121 that is turned by 90° is connected to the pipeline 5. A heating conductor 21 is likewise passed through the pipeline section 121 that is turned by 90°. In order to supply current to the heating conductor 21 both in the pipeline 5 and in the pipeline section that is turned by 90°, the ends of the respective heating conductors that are passed in an insulated manner through the closures 49 are in electrical contact with one another through an external conducting arrangement 119.

In the same way, the pipeline section 121 that is turned by 90° is adjoined by a second pipeline 5, which is likewise turned by 90° with respect to the pipeline section 121 that is turned by 90°, so that altogether a deflection of 180° is achieved. At this point too, the heating conductor 21 is respectively passed through the closure 49 of the ends of the pipeline and electrically connected to one another through an external conducting arrangement 119, so that all the lengths of line through which the molten salt flows can be heated altogether by one heating conductor 21 lying inside.

Figure 12:
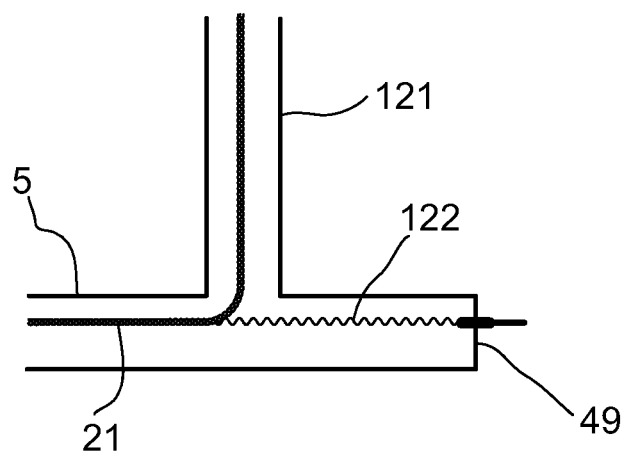
FIG. 12 shows an alternative form of pipeline routing angled away at 90°.

An alternative form of pipeline routing angled away at 90° is shown in FIG. 12. The heating conductor 21 is held in the middle of the pipe by a clamping device 122. The clamping device 122 is attached to the bend in the heating conductor 21 by clamping or welding. This construction makes it possible for the internal heating conductor to follow the direction of flow of the heat transfer medium. In comparison with the embodiment shown in FIG. 11, it does not have a pipeline connector or the external conducting arrangement.

A cross section through a pipeline section with a number of segments is shown in FIG. 13.

A solar loop 3 of a solar power plant is generally divided into a number of segments 51. Each of the segments 51 has a pipeline section 53, which is enclosed by a glass tube 7. The respective segments 51 each serve in this case as a receiver for capturing the solar energy.

The individual pipeline section 53 are usually produced from a metal with good electrical conduction, for example from high-grade steel. In order locally to limit possible parasitic currents from the heating conductor 21 to the pipeline 5, it is preferred to separate the individual pipeline sections 53 from one another by insulators 55. A material which has a greater resistance than the resistance of the heating conductor used as heating conductor 21 is chosen as the material for the insulators 55. Heat-resistant ceramics, mineral-fiber seals or mica seals are suitable in particular as the material for the insulators 55.

In addition to the insulators 55, the individual segments 51 are connected to one another by way of mechanical connections or compensators 57. The mechanical compensators 57 are necessary to compensate for linear expansions of the pipelines 5 during operation.

Although the insulated heating conductor 21 may be attached by insulators inside the pipeline 5, as shown by way of example in FIGS. 7 and 8, it is advantageous to place some of the insulators 55 shown in FIG. 13 in a solar loop, in order to prevent fed-in parasitic currents from accumulating in the pipe system.

Apart from being used in the pipelines 5 of the solar loops 3, the heating conductor 21 according to the invention for the internal heating of a pipeline 5 may also be used for heating the collector 9, distributor 15, heat-transfer medium outflow 11 and heat-transfer medium inflow 13 as well as all the other pipelines through which molten salt flows. If flexible conductors are used, use in flexible hose lines is also possible.

Since the resistance of a metal is generally temperature-dependent, it is also possible furthermore to use the heating conductor 21 for measuring the average temperature of the internal heating conductor and also, indirectly, the molten salt in the pipeline 5. This is particularly advantageous whenever a material which has a strong temperature dependence of the conductivity is used for the heating conductor 21.

The attachment of the heating conductor 21 in the embodiment represented in FIG. 13 takes place in each case at the beginning of a segment 51 with a loop 37 and a hook 39, as shown in FIG. 8. The attachment with the hook 39 means that the heating conductor 21 is secured against displacement within the segment 51. The attachment of the heating conductor 21 within the respective pipeline section 53 takes place, for example, by way of resilient spacers 59. The attachment by resilient spacers may be provided here at one or more positions in the length of pipeline 53 of the segment 51. For assembly, the resilient spacers 59 are in this case preferably pushed into the pipe and are not connected to the pipe wall but only supported on the pipe wall.

Highly heat-resistant steels, for example St 2.4668, or Inconel X750 are preferred as the material for the resilient spacers 59.

The passing of parasitic currents between the heating conductor and the pipe wall is shown by way of example in FIG. 14.

In the case of non-insulated attachment of the insulated heating conductor 21, for example when resilient spacers 59 are used, a current flows via the resilient spacers 59 to the pipeline 5. This is represented by way of example by dashed arrows. The parasitic currents 61 occurring have the effect that heating power does not occur at the heating conductor 21 but elsewhere, for example on the wall of the pipeline 5. As long as the currents through the heating conductor 21 dominate, though parasitic currents 61 reduce the efficiency of the heating they do not put at risk the heating function of the heating conductor 21.

Apart from the parasitic current flow 61 via devices for attachment to the pipe wall, a current flow also occurs through the molten salt on account of the high conductivity of the molten salt in the pipeline 5. This is represented by way of example by arrows 63. If the wall of the pipeline 5 is covered with solidified, low-conductivity salt, the current flow 63 through the molten salt largely stops.

If high-grade steel is used for the heating conductor 21, the parasitic current flow 63 through the molten salt is reduced by a passivating metal oxide/nitrate film about 15 μm thick usually forming on the high-grade steel, the metal oxide/nitrate film offering an appreciable resistance to the current flow.

Furthermore, it is possible for the applied electrical voltage to cause corrosion, owing to an electrochemical reaction. For this reason, it must be ensured that the electrical voltage lying between the heating conductor 21 and the wall of the pipeline 5 lies below the threshold potential at which an electrochemical reaction commences.

Examples of suitable heating conductor geometries are shown in FIGS. 15A to 15E.

The heating conductor 21 may, for example, be designed as a tubular cable, as shown in FIG. 15A. The heating conductor 21 is in this case preferably formed from a steel mesh. During the operation of the heating conductor 21 that is designed in the form of a tubular cable 65, the salt melts first inside the heating conductor 21, whereby there forms within the heating conductor 21 a channel through which molten salt can flow. Salt surrounding the heating conductor 21 that melts can flow into the inner channel 67 through openings in the mesh that forms the tubular cable 65.

As an alternative to a tubular cable 65, as shown in FIG. 15A, it is also possible to design the heating conductor 21 in the form of a tube 69. In this case, it is also advantageous to provide the tube with a perforation through which molten salt can flow into the interior of the tube. The way in which the heating conductor 21 shown in FIG. 15B functions largely corresponds in this case to the way in which the heating conductor 21 shown in FIG. 15A functions.

In FIG. 15C, a heating conductor with a star-shaped cross section is shown. Such a star-shaped cross section has v-shaped depressions 71. During the operation of the heating conductor 21, the salt begins to melt first in the v-shaped depressions 71, so that in each of the v-shaped depressions 71 there forms a channel through which the molten salt can flow.

Apart from the embodiment as a five-pronged star shown in FIG. 15C, any other number of v-shaped depressions and associated prongs is also possible. Apart from v-shaped depressions, it is alternatively also possible, for example, to provide u-shaped depressions.

In FIG. 15D, a heating conductor designed as a rod 73 is shown, the rod 73 being enclosed by a mesh 75, preferably an electrically conductive wire mesh. During the operation of a heating conductor that is designed as shown in FIG. 15D, initially channels through which the molten salt can flow form in the mesh 75. Then there forms a channel surrounding the heating conductor 21.

The embodiments designed as shown in FIGS. 15A to 15D each require a heating conductor of a material that does not corrode in the presence of the molten salt flowing through the pipeline 5. Such a material is, for example, high-grade steel, for example St 1.4571 or else St 1.4301.

However, high-grade steels have poorer current conduction than copper or aluminum, for example, which however generally corrode easily in the salt that is used. To be able to use a heating conductor of a material with better current conduction than high-grade steel, it is possible, for example, to provide a core 77 of a material with good electrical conductivity, for example copper or aluminum, which is enclosed by a corrosion-resistant covering 79, as shown in FIG. 15E. The corrosion-resistant covering 79 may in this case also be, for example, a corrosion-resistant tube which is connected in a good heat-conducting manner to the core 77. This construction offers the option of operating the internal heating conductor entirely without electrical insulating measures in a pipeline.

Figure 16:
FIG. 16 shows a stiff heating conductor with expansion compensation.

A heating conductor with a cross-sectional geometry such as that shown in FIGS. 15A to 15E may be flexible or configured as a stiff conductor. If the heating conductor 21 is configured as a stiff conductor, it is advantageous to provide expansion regions 81 to compensate for changes in length caused by temperature fluctuations. A stiff heating conductor with expansion region 81 is shown by way of example in FIG. 16. The expansion region 81 is in this case designed in a wave form. Apart from the wave-form design shown here, any other geometry that makes length compensation possible is suitable for the design of the expansion region 81.

Figure 17:
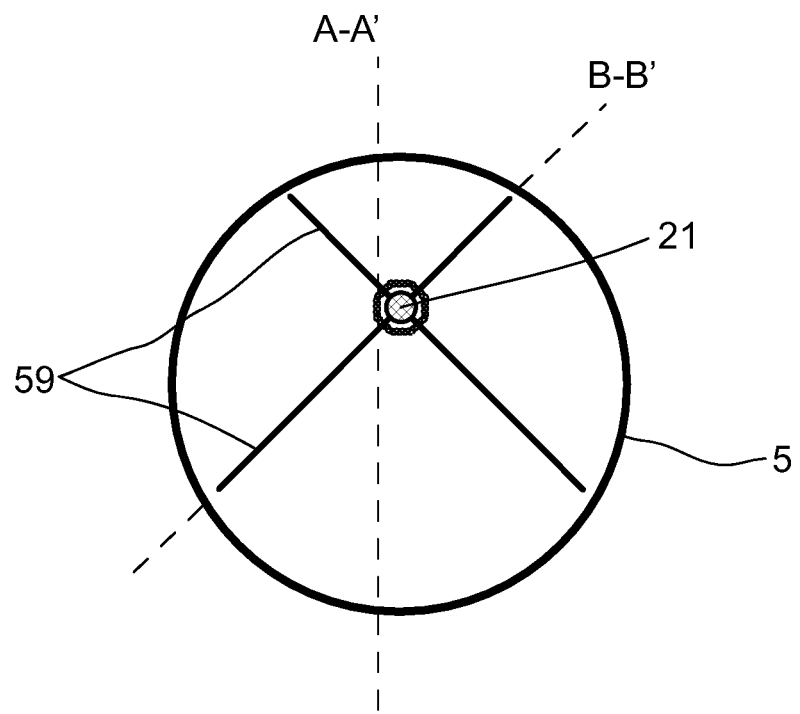
FIG. 17 shows a cross section through a pipeline with a heating conductor held by resilient spacers.

In FIGS. 17 to 19, a heating conductor which is held in a pipeline by resilient spacers is shown.

The resilient spacers 59 are preferably arranged in a crosswise manner. Alternatively, however, it is also possible, for example, to provide only three resilient spacers 59, in this case one of the resilient spacers 59 preferably being aligned perpendicularly. The perpendicularly aligned resilient spacer may in this case be arranged either below or above the heating conductor 21.

One possibility for the attachment of the resilient spacers 59 to the heating conductor 21 is shown in FIG. 18. For the attachment it is thus possible, for example, to clamp the resilient spacers 59 with a sleeve 83. For this purpose, the sleeve 83 is pushed over the heating conductor 21 and an end portion 85 of the resilient spacers 59. Additional attachment is possible, for example, by the sleeve 83 being welded to the heating conductor 21.

The end portion 87 of the resilient spacers 59 that is facing away from the heating conductor is preferably bent into a foot 89. The foot 89 may in this case be designed, for example, in the form of an eyelet. With the foot 89, the resilient spacer 59 is supported on the wall of the pipeline. This is shown in FIG. 19. The use of the resilient spacers 59, as they are shown in FIGS. 17 to 19, serves for keeping the heating conductor 21 at a predetermined height in the pipeline 5. The fact that the resilient spacers 59 are only pressed against the wall of the pipeline 5 by their spring pressure with their respective foot 89 means that it is possible for the resilient spacers 59 to be moved with the flow of the molten salt in the pipeline 5. It is therefore preferred, as shown in FIG. 13, to provide a holder for the heating conductor 21, such as that shown in FIGS. 7 and 8, at regular intervals, preferably at least once in each receiver.

The positioning of the resilient spacers 59 just by pressing of the feet 89 against the wall of the pipeline 5 has the advantage that the heating conductor 21 can, if need be, easily be pulled out of the pipeline 5 together with the resilient spacer 59. This may be required, for example, in the case of necessary maintenance.

Apart from the feet shown in FIG. 19, it is also possible to design the end portions 87 of the resilient spacers 59 that are facing away from the heating conductor in any other desired form that allows retention in the pipeline 5.

Furthermore, it is also possible not just to hold the resilient spacers 59 in the pipeline 5 by their contact pressure, but to attach the resilient spacers 59 in the pipeline releasably, for example by screwing, or unreleasably, for example by welding.

Figure 20:
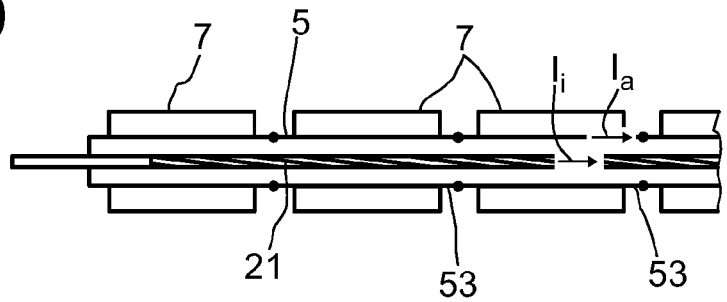
FIG. 20 shows a heating conductor formed as a cable and completely uninsulated in a long pipeline of welded pieces of pipeline.

In FIG. 20 a long pipeline 5 comprising pipeline sections 53 connected to one another by welding, for example receivers of a solar loop, is shown. If the heating conductor 21 is not electrically insulated from the string of pipeline sections 53 welded to one another and a voltage is applied, a current $I_a$ flows through the string of lengths of pipeline 53 and a current $I_i$ flows through the internal conductor, the ratio of the intensities of the currents $I_i/I_a$ being in the ratio of the resistance of the pipeline 5 to the resistance of the heating conducfor 21. Corresponding to the ratio, heat is generated on the pipeline 5 and on the heating conductor 21. By choosing an adequate cross section of the heating conductor 21 and choosing materials with very good electrical conductivity, for example copper or aluminum, the resistance of the heating conductor 21 can be lowered to such an extent that the current is led into the heating conductor 21 sufficiently strongly and the development of heat is concentrated on the heating conductor 21.

In the arrangement shown here, no potential differences between the heating conductor 21 and the pipeline 5 occur over the entire pipeline 5. The pipeline 5 should be electrically insulated from the apparatus framework not shown here, by which the pipeline 5 is carried.

In the case of the uninsulated internal heating conductor, the lead-in of the heating conductor 21 into the space inside the pipe may be created simply by clamped/screwed unions.

Figure 21:
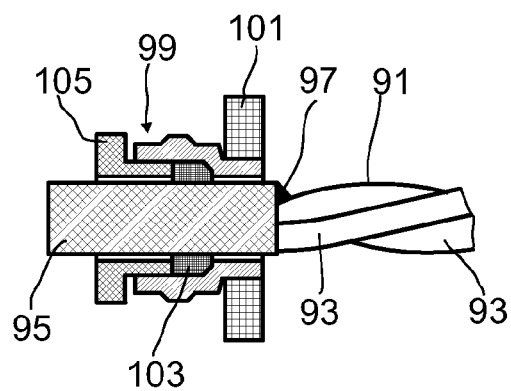
FIG. 21 shows a heating conductor formed as a cable with a lead-through through a blind flange.

In FIG. 21, a heating conductor formed as a cable with a lead-through through a blind flange is shown.

In the embodiment shown here, the heating conductor 21 takes the form of a cable 91. The cable 91 is in this case twisted from a number of stranded conductors 93.

Here, the cable may be produced for example from three stranded conductors, as shown in FIG. 21, or else from one or two or more than three stranded conductors.

For the attachment of the heating conductor 21 formed as a cable 91 to an end piece of a pipeline section 47, the cable 91 is connected to a round rod 95. The connection of the cable 91 to the round rod 95 is performed for example by a welded connection, or alternatively also by screwing or clamping. In the case of a clamped connection, the round rod 95 is clamped onto the cable 91. In the embodiment shown here, the cable 91 is connected to the round rod 95 by a welded connection 97.

The round rod 95 is led through a stuffing-box lead-through 99 through the blind flange 101, with which the pipeline section 53 is closed off. For the attachment of the round rod 95, the stuffing-box lead-through 99 comprises a stuffing box 103. This is braced with a clamping sleeve 105.

A voltage may be applied to the round rod 95 in order to supply voltage to the heating conductor 21 formed as a cable 91.

Figures 22A, 22B, 22C:
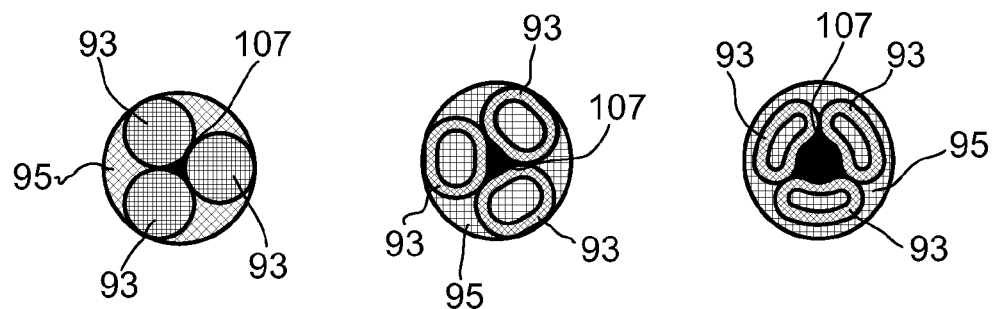
FIGS. 22A to 22C show cross sections of different heating conductors formed as a cable.

In FIGS. 22A to 22C, cross sections of different heating conductors formed as a cable are shown.

The cables 91 shown in FIGS. 22A to 22C are in each case made up of three stranded conductors 93.

In FIG. 22A, the stranded conductors 93 are of a solid configuration. Between the individual stranded conductors there forms an interstitial channel 107, through which the melting salt can flow away during remelting.

In the embodiment shown in FIG. 22B, the stranded conductors 93 are formed as flattened tubes. The flattening has the effect that a larger interstitial channel 107 forms in comparison with the embodiment shown in FIG. 22A. An even larger interstitial channel 107 is obtained in the case of the embodiment shown in FIG. 22C, in which individual stranded conductors 93 from which the cable 91 is twisted have a kidney-shaped design.

Figure 23:
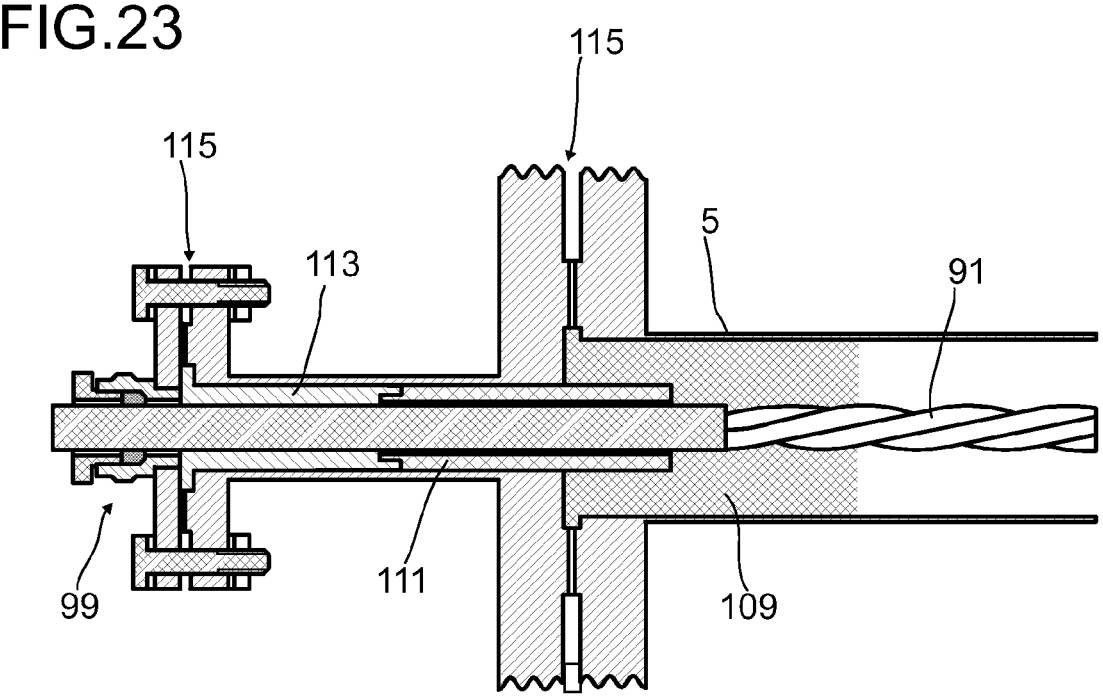
FIG. 23 shows an alternative lead-through of a heating conductor through a blind flange.

An alternative embodiment for leading the heating conductor through the end length of a pipeline is shown in FIG. 23.

In order to make the stuffing box with conventional materials, in particular a sealing ring produced from a customary polymer material, it is necessary to realize a temperature gradient along the heating conductor and the round rod. The temperature gradient is set by the end of the pipeline 5 through which the round rod 95 is passed being insulated less well. In addition, the formation of a gradient may be assisted by an inner thermal insulation of the lead-through of the heating conductor 21. The inner thermal insulation can be realized, for example, by using ceramic fibers which have a thermal resistance of, for example, up to 580° C. A corresponding filling with ceramic fibers is denoted by reference numeral 109. The round rod 95 is initially enclosed by a first sleeve of an electrically insulating and temperature-resistant material, for example ceramic or silicon carbide. The first sleeve 111 preferably has a temperature resistance of up to 580° C.

The first sleeve 111 is adjoined by a second sleeve 113. The second sleeve 113 is produced from a likewise electrically insulating material, which however may have a lower temperature resistance. For example, a temperature resistance up to 260° C. is sufficient. A high-temperature plastic, such as PTFE, may be used for example as the material for the second sleeve 113.

The second sleeve 113 is then adjoined by the stuffing-box lead-through 99. For this purpose, the stuffing-box lead-through 99 is attached to a flange 115 at the end of the pipeline.

The round rod 95 that is used preferably comprises a material with good electrical conductivity. Here it is possible to make the round rod completely from the material with good electrical conductivity, or alternatively to provide a core of a material with good electrical conductivity which is enclosed by a material with less good conductivity, for example steel. Copper or aluminum are suitable, for example, as the material with good electrical conductivity. Particularly preferably, a round rod 95 with a copper core is used.

Figure 24:
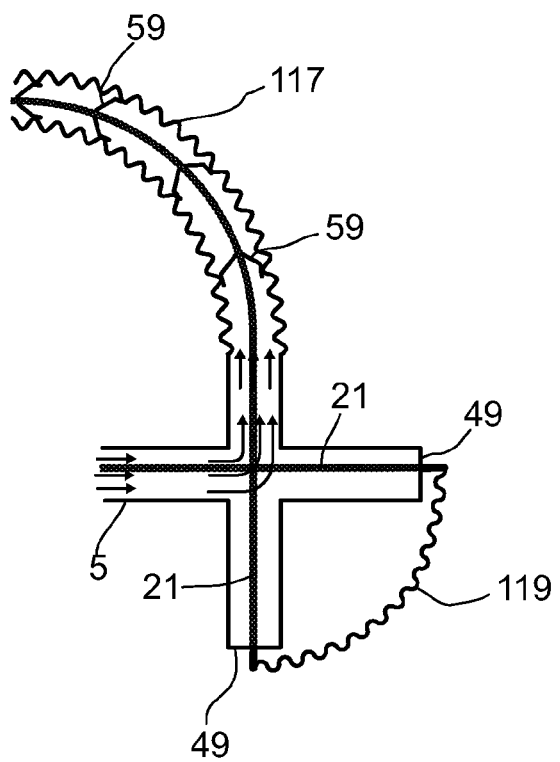
FIG. 24 shows how a heating conductor is provided in a movable pipe connection.

In FIG. 24 it is shown how a heating conductor is provided in a movable pipe connection.

Apart from a flow deflection as shown in FIGS. 10 and 11, it is alternatively also possible, for example, to provide a movable pipe connection for the flow deflection. Here, a pipe bend 117 is produced from a flexible material. For this purpose it is possible, for example, to design the pipe bend in a wave form or a zigzag form in order to achieve the necessary flexibility.

In order to be able to remelt the salt in the pipe bend 117 after it freezes, it is also necessary to provide a heating conductor 21 in the pipe bend 117. To avoid the heating conductor coming into contact with the walls of the pipe bend 117, the heating conductor 21 is fixed in the pipeline, for example by a resilient spacer 59, as shown in FIGS. 17 and 18. The spacing of the individual resilient spacers 59 is chosen such that the heating conductor 21 does not come into contact with the pipe wall even during bending of the pipe connection.

Apart from the deflection at the end of a solar loop, a movable pipe connection such as that shown in FIG. 24 may also have been included for example between individual solar receivers, in order to adapt the pipeline with the receivers respectively to the optimum position in relation to the sun.

If, in addition to the flexible pipe bend, a deflection by 90° is provided, as shown in FIG. 24, it is advantageous to lead the heating conductor out of the pipeline from the pipeline section 47 in a blind flange, for example as shown in FIGS. 21 and 23, and to connect the heating conductor at the end in an electrically conducting manner to an external conducting arrangement 119. The pipeline section 121 that is turned by 90° likewise ends in a closure 49, which is configured for example as a blind flange, and through which there is passed a heating conductor 21, which is then led through the movable pipe connection.

Apart from deflection and movable pipeline sections, a pipeline usually also comprises fittings, for example valves. A cross section through a valve with a heating conductor provided in it is shown by way of example in FIGS. 25 and 26.

Figure 25:
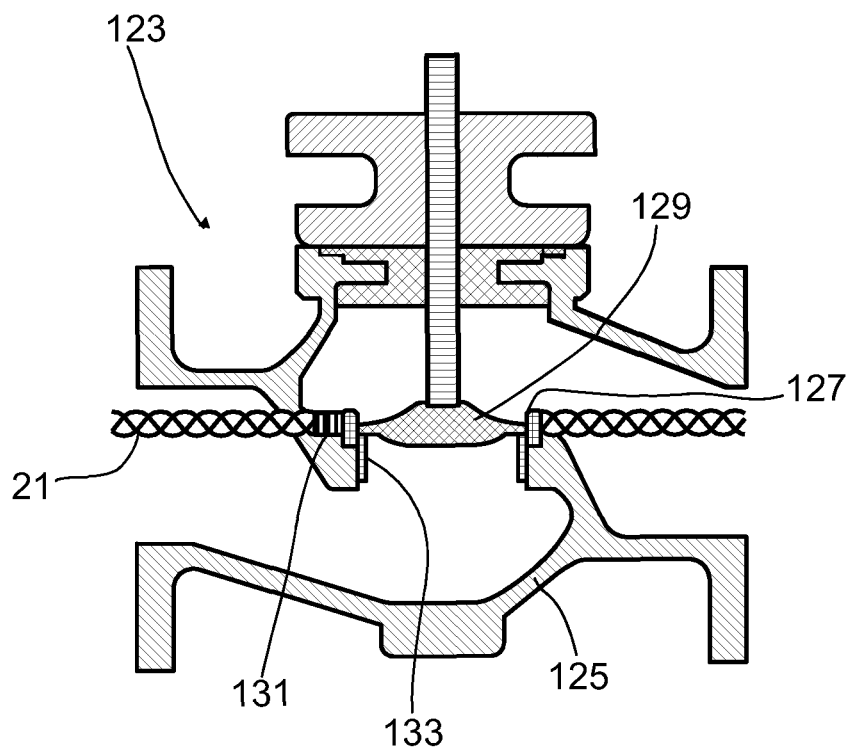
FIG. 25 shows a cross section through a valve with a heating conductor provided in it.
Figure 26:
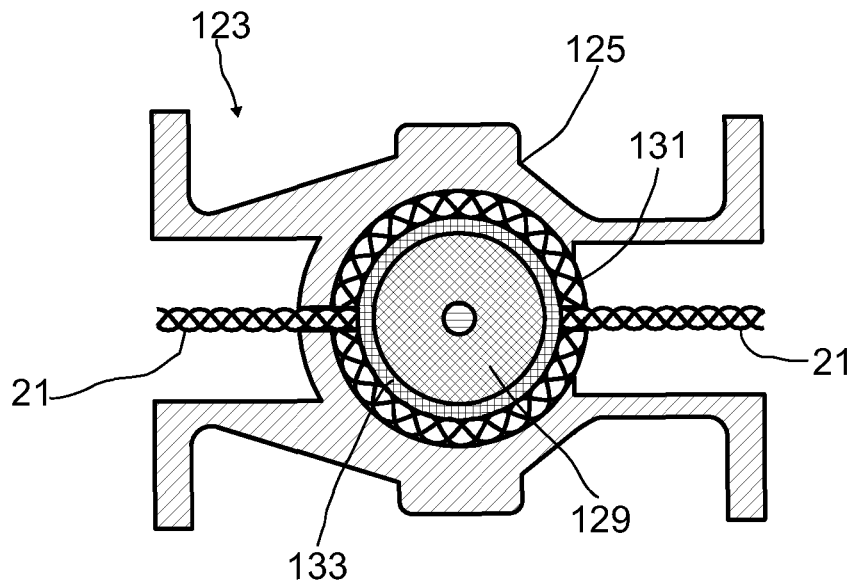
FIG. 26 shows a section through the valve from FIG. 25 in plan view.

FIG. 25 shows a cross section through a valve 123 with a heating conductor 21 provided in it and FIG. 26 shows a section through the valve from FIG. 25 in plan view.

A valve usually comprises a valve body 125 with a valve seat 127 and a closing element 129. To be able to melt a solidified salt within the valve, the heating conductor 21 is provided along the valve seat 127 in the form of a ring. This means that the heating conductor forms a heating ring 121. The heating ring 131 is in this case positioned such that the closing function of the valve 123 is not impaired. Moreover, a direct connection between the heating ring 131 and the closing element 129 should be avoided when the heating conductor 21 is carrying a voltage. For this reason, it is advantageous to provide an electrical insulation 133 on the valve seat 127. In this case, the electrical insulation 133 preferably forms the valve seat 127. To avoid a short-circuiting current flowing from the heating conductor 21 or the heating ring 131 to the valve body 125, it is advantageous furthermore also to electrically insulate the heating ring 131 and the heating conductor 21 with respect to the valve body 125. For this purpose, for example, an electrically insulating material, for example a ceramic, is introduced into the valve body 125 in the region in which the heating ring 131 lies against the valve body 125. It is essential here that the material used for the electrical insulation is thermally stable with respect to the fittings occurring in the valve.

Apart from the embodiment of a valve shown in FIGS. 25 and 26, it is also possible by analogy to provide the heating conductor 21 in other fittings, such as for example flaps or slides, by way of a heating ring 131, for example, or by another geometrical design.

EXAMPLES

Example 1

A heating conductor 21 configured as a high-grade steel rod is used for heating a 200 m long pipeline. The heating conductor has a diameter of 25 mm. The heating conductor is in this case produced from high-grade steel St 1.4301.

The resistivity of the heating conductor 21 is 0.00073 Ω/mm at an operating temperature of 290° C. The specific power required for the heating is 100 W/m. The voltage applied for the heating is 77.3 V and the current intensity is 259 A. The power required on account of the length of 200 m is 20 kW. However, this power is only required during the very short melting time.

If a higher voltage is used for the heating, it is possible to choose a smaller cross section of the heating conductor. The thermal output dropping across the heating conductor may, for example, be reduced by thyristor-switched pulsed operation.

If the heating conductor is attached in the pipeline 5 by way of heating conductor holders which are not electrically insulated, the heating conductor holders being designed, for example, as springs with a diameter of 1.5 mm, parasitic currents are produced, on the one hand via the heating conductor holders on the pipe wall and on the other hand through the electrically conducting molten salt. The parasitic currents produced are presented by way of example in the following table.

TABLE

| Parasitic currents | | | | | | |
|---|---|---|---|---|---|---|
| Description of current path | Cross section mm² | Form of conduction | Diameter mm | Resistance Ω | Current intensity A | Resistivity Ω/m |
| Current in heating conductor | 490.9 | Circle | 25.0 | 0.0051 | 265.6 | 0.0134 |
| Current via heating conductor holders | 1.77 | Circle | 1.5 | 0.0267 | | 0.0134 |
| Current via outer tube | 427.3 | Circle | | 0.0059 | | 0.0134 |
| Sum | | | | 0.0325 | 41.48 | |
| Current through molten salt | 181.427 | Rectangle | | 13.62 | 0.10 | 0.0049 |

The very much lower current intensity via the heating conductor holders and the outer tube as well as through the molten salt in comparison with the current intensity in the heating conductor shows that, even with an electrically conducting connection and parasitic currents via the heating conductor holders and through the molten salt, a sufficiently great heating power is produced in the heating conductor to melt the salt surrounding the heating conductor 21, thereby producing a channel surrounding the heating conductor 21 through which molten salt can flow in order to equalize pressures caused by the increasing volume due to the melting of the salt.

Example 2

A pipeline of high-grade steel 1.4541 has a conductivity of 1.7 m/(ohms·mm²) and an inside diameter of 65 mm and a wall thickness of 2 mm. The cross-sectional area of the pipeline is 421 mm². The conductivity of the pipe is 716 m/ohm. If 90% of the development of heat is intended to take place on an internal conductor inside the pipeline, it is necessary that the internal conductor takes up 10 times the amount of current. For this purpose, it requires a conductivity of 7.157 m/ohm. Copper has at a temperature of 20° C. an electrical conductivity of 56.2 m/(ohms·mm²). This gives a necessary cross-sectional area for an internal conductor of copper of 127 mm². This corresponds to a copper wire with a diameter of 12.7 mm or three copper wires each with a diameter of 7.4 mm. If an internal conductor of aluminum is to be used, this requires for the same conductivity a diameter of 15.8 mm.

On account of the very much smaller mass, and consequently the very much smaller heat capacity, of the internal conductor in comparison with the pipeline, smaller diameters are sufficient for the internal conductor to achieve the effect that it is heated up with preference. It is generally sufficient if even less than 50% of the overall current is passed to the internal conductor. This makes it possible to configure the internal conductor with a small diameter and to use only less expensive material with good electrical conductivity, for example copper. In the case of a DN65 pipeline system, for example, it may be sufficient to form the heating conductor from three copper wires each with a diameter of 5 mm. The copper wires are in this case preferably twisted to form a cable.

It should be noted that, when there is an increase in temperature, the electrical conductivity of copper falls much faster than the conductivity of high-grade steel. However, the relative fall is not so great that it could disturb the intended heating-up of the internal conductor. It should be remembered here that the internal conductor does not have to be heated much beyond the melting point of the heat transfer salts.

St 1.4541, which is used as a standard pipe material, has an electrical conductivity that is low for steels. However, it may be favorable here to produce the pipeline material, for example the absorber pipe of the individual receivers in a solar loop, completely or partially from another high-grade steel that has a still lower conductivity. Such a steel is, for example, St 1.4301. Here, however, corrosion compatibility with the heat transfer medium that is used must also be ensured.

Depending on the type of molten salt, it may be necessary to avoid direct contact of copper or aluminum that is used for the heating conductor with the molten salt, in order to avoid corrosion on the heating conductor or in order not to impair the stability of the salt. A possible incompatibility of the material of the heating conductor, for example copper or aluminum, with the salt used as the heat transfer medium can be solved, for example, by the individual stranded conductors of the heating conductor being configured with an outer high-grade steel casing.

It is alternatively also possible to attach the internal conductor as close as possible to a wall of the pipeline. By choosing material with high conductivity, a current flow through the pipeline could be concentrated on particularly suitable regions thereof, for example the upper region of the pipeline. However, the flexibility and thermal properties of such a construction are poorer than those of a heating conductor lying on the inside.

SEQUENCE LISTING

Not Applicable

| List of designations | |
|---|---|
| 1 | solar array |
| 3 | solar loop |
| 5 | pipeline |
| 7 | glass tube |
| 9 | collector |

-continued

| List of designations | |
|---|---|
| 11 | heat-transfer medium outflow |
| 13 | heat-transfer medium inflow |
| 15 | distributor |
| 17 | evacuated bubble |
| 19 | solidified salt |
| 20 | foam-like region |
| 21 | heating conductor |
| 23 | main voltage supply |
| 25 | supply line |
| 27 | transformer |
| 29 | eyelet |
| 31 | loop |
| 33 | insulating sleeve |
| 35 | widening |
| 37 | loop |
| 39 | hook |
| 41 | sleeve |
| 43 | channel |
| 45 | pipe bend |
| 47 | pipeline section |
| 49 | closure |
| 51 | segment |
| 53 | pipeline section |
| 55 | insulator |
| 57 | mechanical compensator |
| 59 | resilient spacer |
| 61 | parasitic current flow |
| 63 | current flow through the molten salt |
| 65 | tubular cable |
| 67 | inner channel |
| 69 | perforated tube |
| 71 | v-shaped depression |
| 73 | rod |
| 75 | mesh |
| 77 | core |
| 79 | corrosion-resistant tube |
| 81 | expansion region |
| 83 | sleeve |
| 85 | end portion of the resilient spacers 59 |
| 87 | end portion facing away from the heating conductor |
| 89 | foot |
| 91 | cable |
| 93 | stranded conductor |
| 95 | round rod |
| 97 | welded connection |
| 99 | stuffing-box lead-through |
| 101 | blind flange |
| 103 | stuffing box |
| 105 | clamping sleeve |
| 107 | interstitial channel |
| 109 | ceramic fibers |
| 111 | first sleeve |
| 113 | second sleeve |
| 115 | flange |
| 117 | pipe bend |
| 119 | external conducting arrangement |
| 121 | pipeline section turned by 90° |
| 122 | clamping device |
| 123 | valve |
| 125 | valve body |
| 127 | valve seat |
| 129 | welding elements |
| 131 | heating ring |
| 133 | electrical insulation |

The invention claimed is:

1. A pipeline for carrying a molten salt comprising a pipe wall that is stable with respect to the temperatures occurring, a heating conductor disposed inside the pipeline for heating, the heating conductor preferably not lying against the inner wall of the pipeline, wherein the heating conductor is designed in the form of a tube or a channel of any desired cross section and openings are formed in the wall of the tube or channel, or wherein the heating conductor is designed as an annular knit or weave, or wherein the heating conductor has at least one u-shaped or v-shaped depression extending in the axial direction.

2. The pipeline according to claim 1 wherein the heating conductor is arranged off-center in the pipeline, the distance of the heating conductor in the downward direction being greater than in the upward direction in the case of a length of pipe running with a maximum gradient of 45°.

3. The pipeline according to claim 1, wherein the heating conductor is arranged centrally in the pipeline if the pipeline has a gradient of more than 45°.

4. The pipeline according to claim 1, wherein the heating conductor is passed through eyelets in the pipeline through which the molten salt flows.

5. The pipeline according to claim 4, wherein an insulator is applied to the heating conductor and the heating conductor is attached with the insulator in the eyelet.

6. The pipeline according to claim 1, wherein the heating conductor is attached by resilient spacers inside the pipeline.

7. The pipeline according to claim 1, wherein the heating conductor is provided with loops, which are suspended in attachment hooks in order to attach the heating conductor in the pipeline.

8. The pipeline according to claim 1, wherein the heating conductor is designed in the form of a tube or a channel of any desired cross section and openings are formed in the wall of the tube or channel.

9. The pipeline according to claim 1, wherein the heating conductor is designed as an annular knit or weave.

10. The pipeline according to claim 1, wherein the heating conductor has at least one u-shaped or v-shaped depression extending in the axial direction.

11. The pipeline according to claim 1, wherein the pipeline comprises an inner pipe, through which the molten salt flows.

12. The pipeline according to claim 1, wherein the heating conductor is divided into heating conductor segments, the heating conductor segments being connected with low electrical resistance.

13. The pipeline according to claim 12, wherein the length of the heating conductor segments corresponds to the length of one or more segments of the pipeline.

14. The pipeline according to claim 1, wherein the pipeline is divided into individual segments.

15. The pipeline according to claim 1, wherein the pipeline is a pipeline in a solar array of a parabolic-trough solar power plant.

16. The pipeline according to claim 1, wherein pipe bends for flow deflection each have a pipeline section that continues in the direction of the pipeline, the pipeline section being closed by a closure and the heating conductor being passed through the closure of the pipeline section.

17. The pipeline according to claim 16, wherein the closure of the pipeline section is configured as a blind flange.

18. The pipeline according to claim 1, wherein the surface material for the heating conductor is chosen from high-grade steel that is corrosion-resistance to nitrate.

19. The pipeline according to claim 1 wherein the heating conductor is provided in the pipeline in an uninsulated manner.

20. The pipeline according to claim 19, wherein the heating conductor is produced from a number of tubes filled with a material of good electrical conductivity.

21. The use of a molten salt comprising sodium nitrate and potassium nitrate, the proportion of sodium nitrate being at least 60% by weight, as a heat transfer medium in a solar power plant, wherein the solar power plant comprises at least one pipeline according to claim 1.

* * * * *